(12) United States Patent
Satou

(10) Patent No.: US 11,070,365 B2
(45) Date of Patent: Jul. 20, 2021

(54) ENCRYPTION COMMUNICATION SYSTEM, ENCRYPTION COMMUNICATION METHOD, SECURITY CHIP, COMMUNICATION APPARATUS, AND CONTROL METHOD AND CONTROL PROGRAM OF COMMUNICATION APPARATUS

(71) Applicant: NEC CORPORATION, Tokyo (JP)

(72) Inventor: Masayuki Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 16/083,557

(22) PCT Filed: Feb. 14, 2017

(86) PCT No.: PCT/JP2017/005311
§ 371 (c)(1),
(2) Date: Sep. 10, 2018

(87) PCT Pub. No.: WO2017/154484
PCT Pub. Date: Sep. 14, 2017

(65) Prior Publication Data
US 2019/0081776 A1    Mar. 14, 2019

(30) Foreign Application Priority Data

Mar. 11, 2016   (JP) .............................. JP2016-048244

(51) Int. Cl.
| H04L 29/06 | (2006.01) |
| H04L 9/08 | (2006.01) |
| H04L 9/06 | (2006.01) |
| G09C 5/00 | (2006.01) |
| G09C 1/00 | (2006.01) |

(52) U.S. Cl.
CPC .............. *H04L 9/0825* (2013.01); *G09C 1/00* (2013.01); *G09C 5/00* (2013.01); *H04L 9/0618* (2013.01);
(Continued)

(58) Field of Classification Search
CPC ... H04L 9/0825; H04L 9/0618; H04L 9/0637; H04L 9/0841
(Continued)

(56) References Cited

U.S. PATENT DOCUMENTS

| 6,018,581 A | 1/2000 | Shona et al. |
| 2005/0094805 A1* | 5/2005 | Kitani .................. H04L 9/0844 380/28 |

(Continued)

FOREIGN PATENT DOCUMENTS

| JP | 08185445 A | 7/1996 |
| JP | 09-238132 A | 9/1997 |

(Continued)

OTHER PUBLICATIONS

Trimberger, "FPGA Security: Motivations, Features, and Applications", Aug. 2014, IEEE, pp. 1248-1265 (Year: 2014).*

(Continued)

Primary Examiner — Taghi T Arani
Assistant Examiner — Gregory A Lane
(74) Attorney, Agent, or Firm — Sughrue Mion, PLLC

(57) ABSTRACT

This invention is directed to an encryption communication system for preventing leakage of a common key and improving the confidentiality of communication information. The encryption communication system uses a pair of a first private portion and a first public portion and a pair of a second private portion and a second public portion in a key predistribution system (KPS) The encryption communication system comprises a ciphertext generator that generates a ciphertext by generating, in a first security chip (TPM) of a first communication apparatus, a first common key by the first private portion held in the first security chip using the second public portion transmitted from a second communication apparatus as a communication partner, and encrypting (Continued)

a plaintext using the first common key in the first security chip, and a decryptor that generates a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip.

13 Claims, 32 Drawing Sheets

(52) U.S. Cl.
CPC .......... *H04L 9/0637* (2013.01); *H04L 9/0841* (2013.01); *H04L 9/0877* (2013.01); *H04L 63/0428* (2013.01); *H04L 63/0435* (2013.01); *H04L 63/061* (2013.01); *H04L 63/062* (2013.01); *H04L 2209/127* (2013.01); *H04L 2463/061* (2013.01); *H04L 2463/062* (2013.01)

(58) Field of Classification Search
USPC ........................................................ 713/171
See application file for complete search history.

(56) References Cited

U.S. PATENT DOCUMENTS

| 2006/0168292 | A1* | 7/2006 | Yukimatsu ............. H04L 69/16 709/231 |
|---|---|---|---|
| 2008/0104706 | A1 | 5/2008 | Karp et al. |
| 2008/0263363 | A1* | 10/2008 | Jueneman ............... H04L 9/085 713/184 |
| 2011/0274268 | A1 | 11/2011 | Vigilant et al. |
| 2015/0242656 | A1 | 8/2015 | Dasari et al. |

FOREIGN PATENT DOCUMENTS

| JP | 2008-035449 A | 2/2008 |
|---|---|---|
| JP | 2010011400 A | 1/2010 |
| JP | 2010-508576 A | 3/2010 |
| JP | 2012-506658 A | 3/2012 |
| JP | 2014-050038 A | 3/2014 |
| JP | 2015-233201 A | 12/2015 |
| JP | 2017-060031 A | 3/2017 |

OTHER PUBLICATIONS

"The security frontier leveraged by TPM", Japan Electronics and Information Technology Industries Association, TCG Technical Committee, Mar. 10, 2007, 23 pages, http://home.jeita.or.jp/is/committee/infopolicy/tcg/d20071003.pdf.
International Search Report of PCT/JP2017/005311 dated May 16, 2017.
Notice of Reasons for Refusal dated Sep. 24, 2019 from the Japanese Patent Office in application No. 2016-048244.
Tomoo, S., "Security+ The compulsory subject of security society", Japan, a Kabushikigaisha Uchida human-resources development center, Oct. 1, 2015, the first edition 1st printing, pp. 25-26, 40-44 (pp. 2-10/E, 9 pages).

* cited by examiner

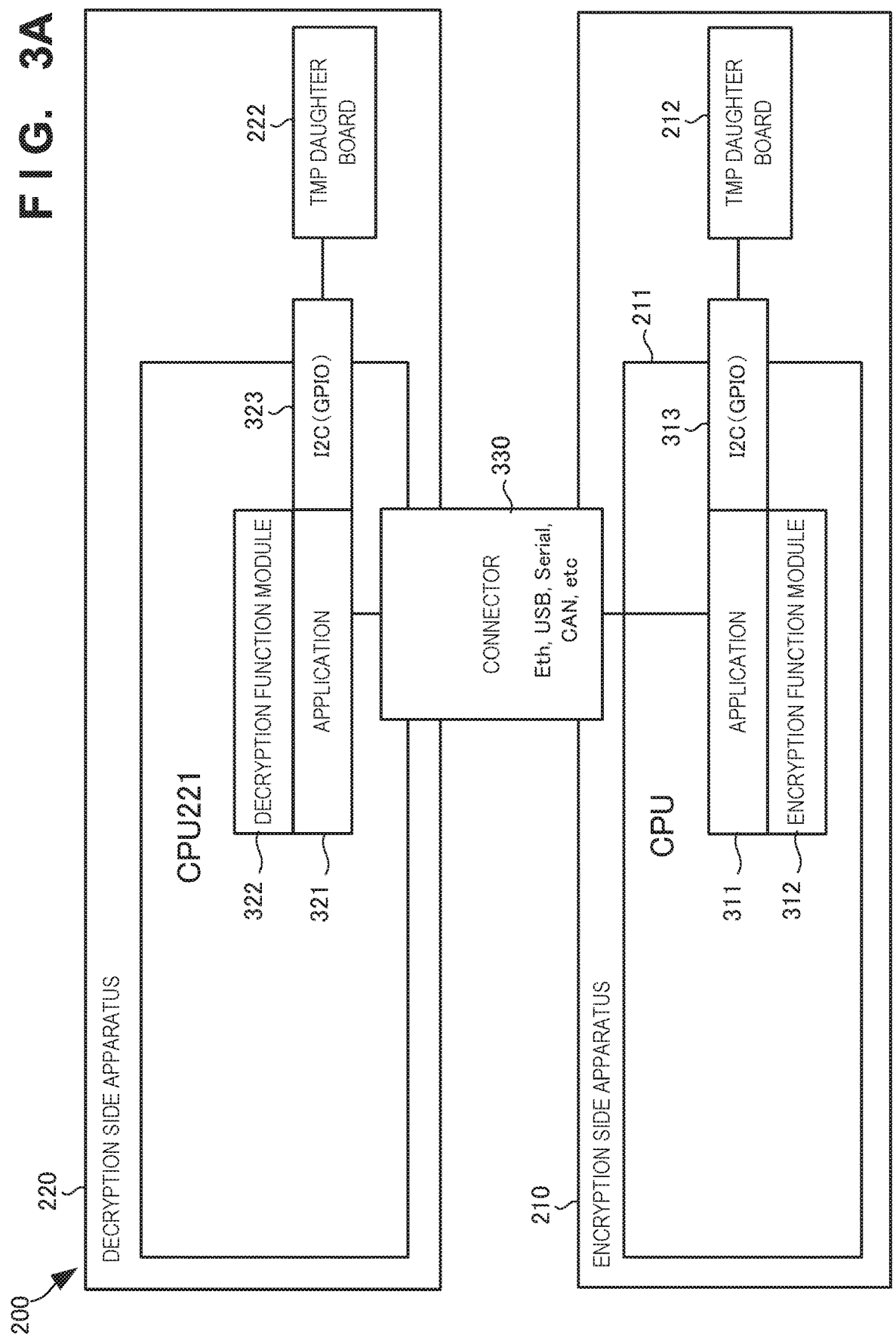

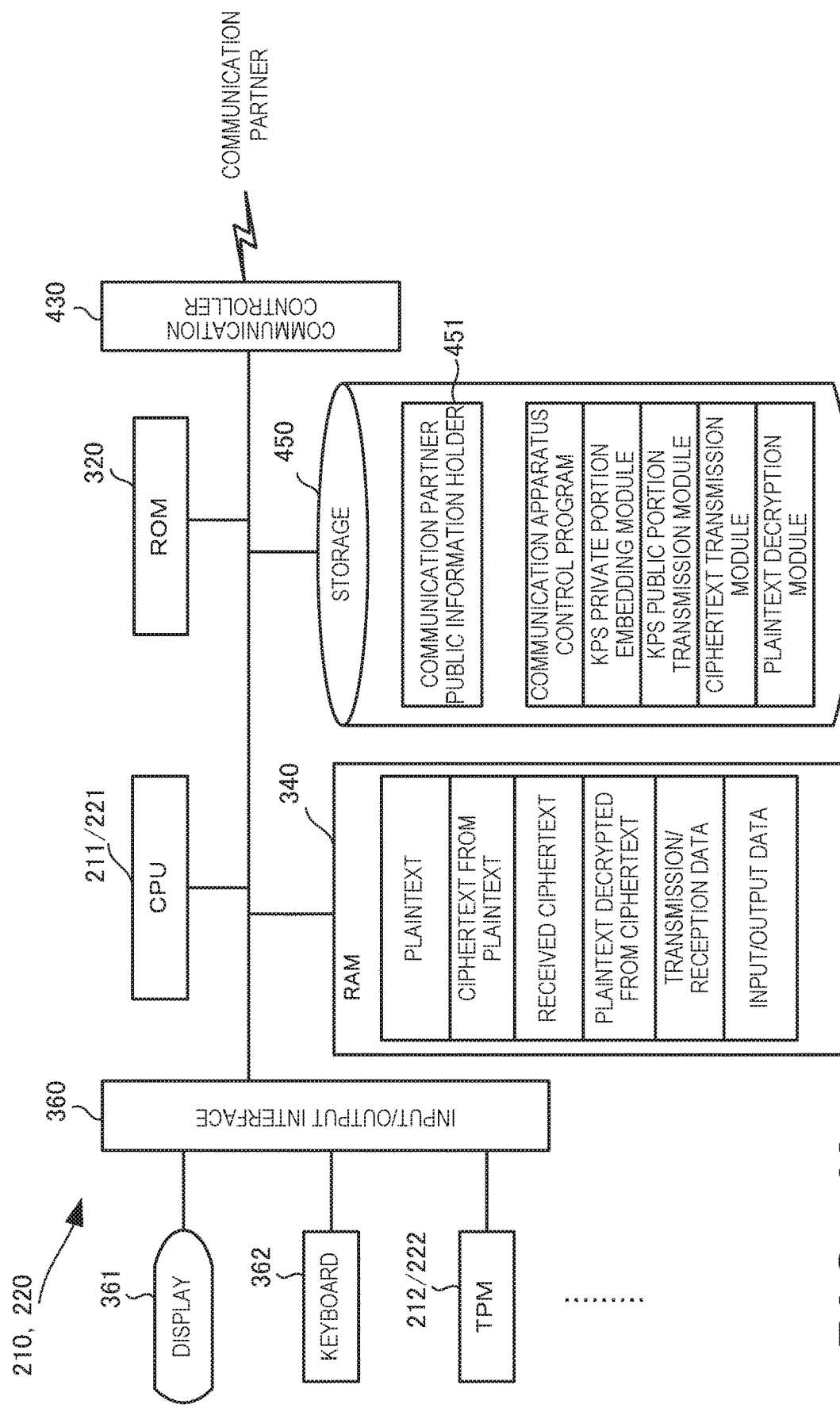
F I G. 4A

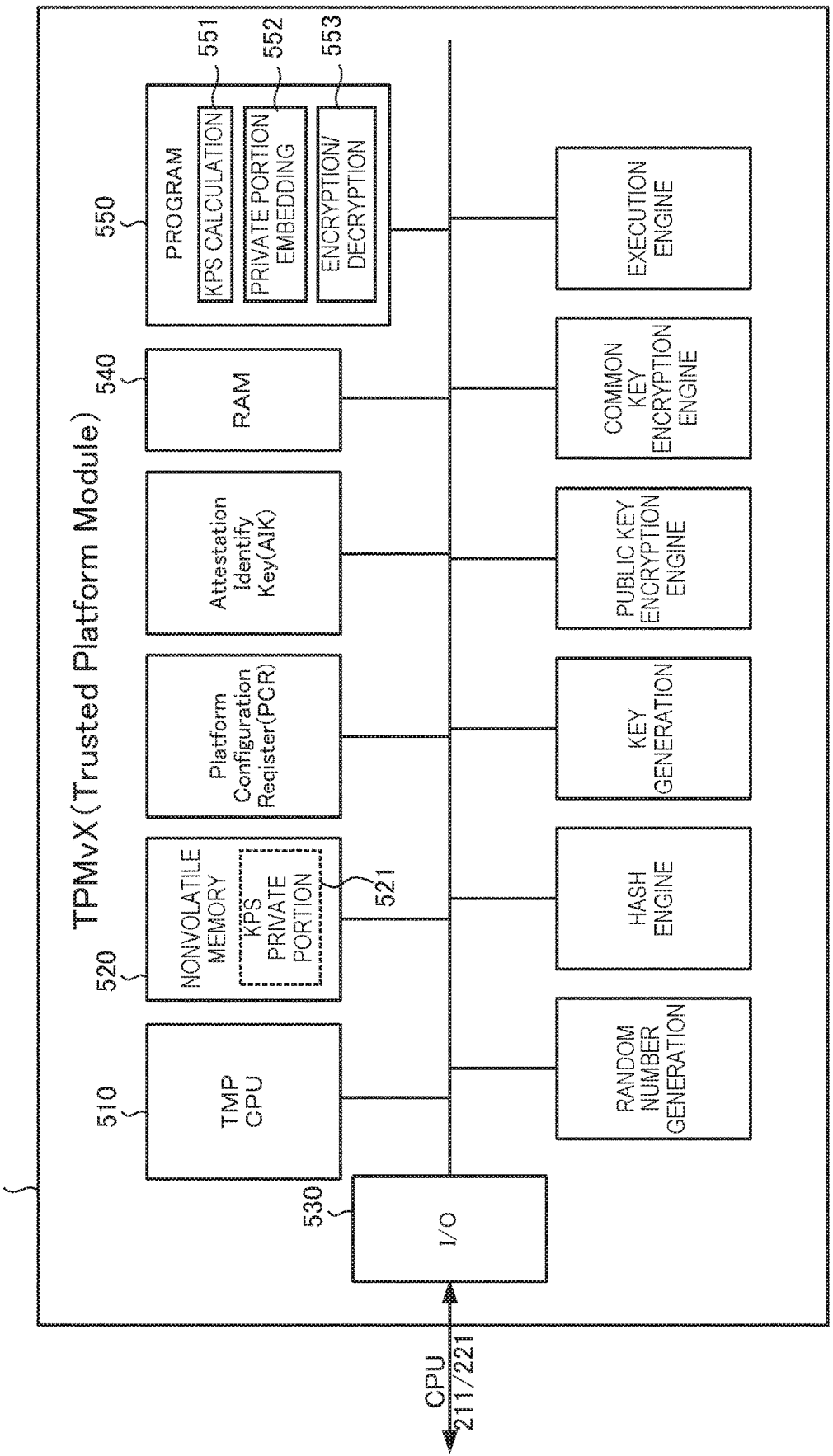
F I G. 5A

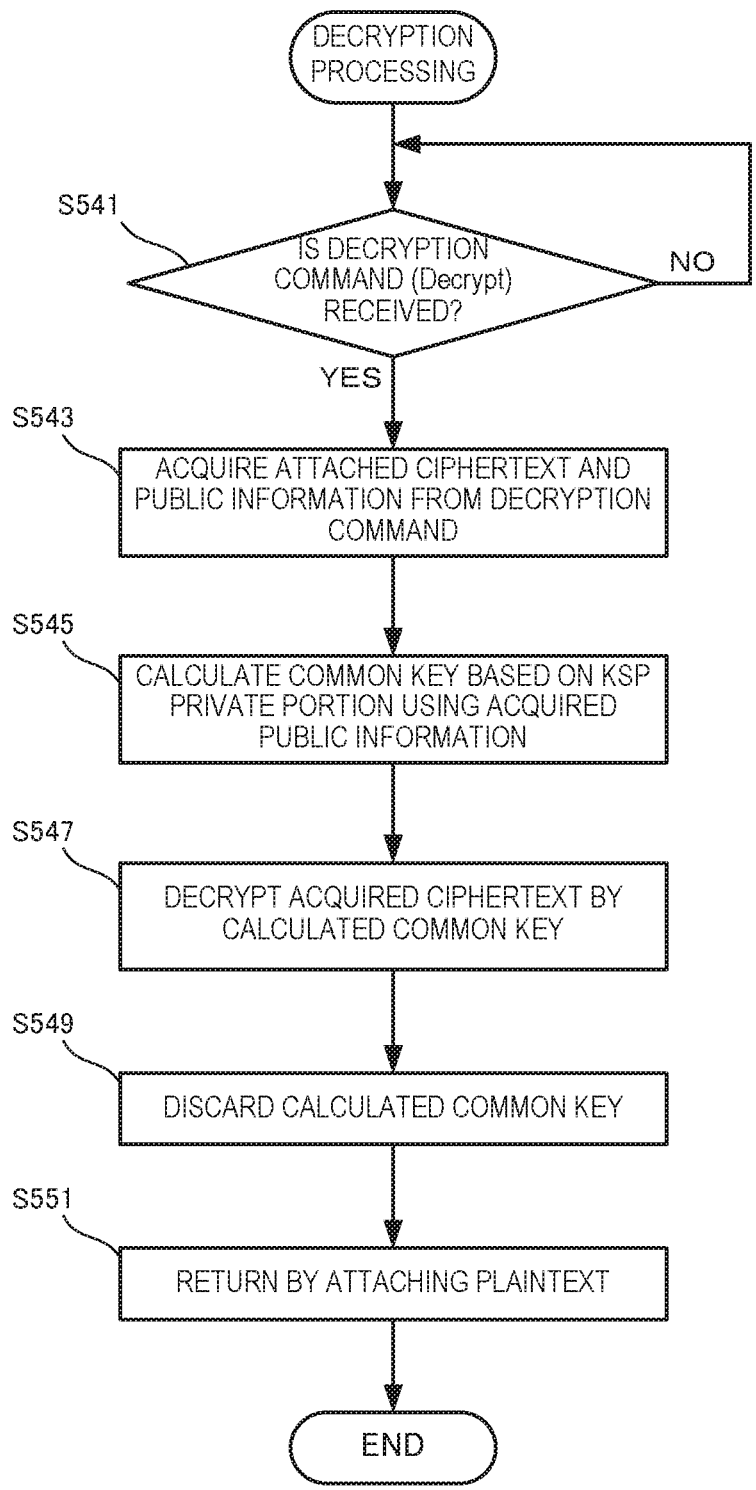
F I G. 5D

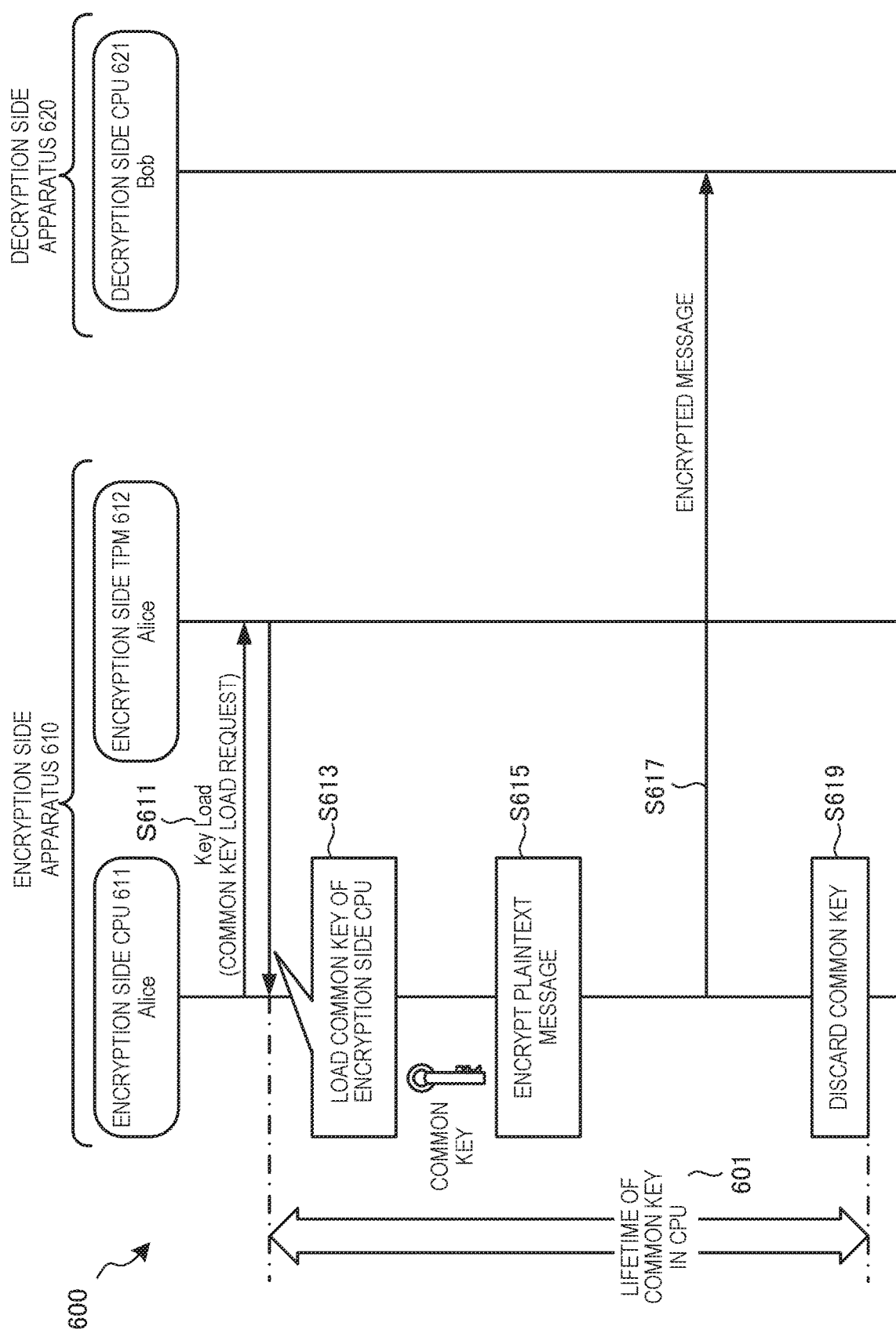

Blom ALGORITHM AS KPS (Key Pre-Distribution Scheme)
<LOGIC>
Here is Blom scheme for $\kappa=1$. For each node U, a value $\gamma u \in Z_p$ is made public (where $p \geqq n$ is prime). The value $\gamma u$ are distinct elements of $Z_p$.
Protocol: Blom's key distribution scheme ($\kappa=1$).

The TA(Trusted Authority) chooses three random elements a, b, c $\in Z_p$ (not necessarily distinct), and forms the polynominal
$f(x, y) = a + b(x+y) + cxy \mod p$.
For each node U, the TA computes the polynominal
$gu(x) = f(x, \gamma u) \mod p = \alpha u + \beta u x$
and transmits ($\alpha u, \beta u$) to U over a secure channel.
The Key for U and V is
$Ku, v = Kv, u = f(\gamma u, \gamma v) = gu(\gamma v) = gv(\gamma u)$
Where U computes $Ku,v = gu(\gamma u)$, and V computes $Kv, u = gv(\gamma u)$.
We have $\alpha u = (a + b\gamma u) \mod p$
$\beta u = (b + c\gamma u) \mod p$
$gu(\gamma u) = a + b(\gamma u + \gamma v) + c\gamma u \gamma v = f(\gamma u, \gamma v) \mod p$.

<PRACTICAL EXAMPLE>
IF a = 8, b = 7, c = 2, p = 17, $\gamma u$ = 12, $\gamma v$ = 7, $\gamma w$ = 1,
$f(x, y) = 8 + 7(x+y) + 2xy$

651

$gu(x) = f(x, ru) \mod p = (8 + 7(x + 12) + 2*12x) \mod 17$
$gw(x) = f(x, rw) \mod p = (8 + 7(x + 1) + 2*1x) \mod 17$
$Ku, v = gu(v) = (8 + 7(7 + 12) + 2*12*7) \mod 17 = 3$
$Ku, w = gu(w) = (8 + 7(1 + 12) + 2*12*1) \mod 17 = 4$
$Kv, w = gv(w) = (8 + 7(1 + 7) + 2*7*1) \mod 17 = 10$ $gv(x) = f(x, rv) \mod p = (8 + 7(x + 7) + 2*7x) \mod 17$ $Kv, u = gv(u) = (8 + 7(12 + 7) + 2*7*12) \mod 17 = 3$
$Kw, u = gw(u) = (8 + 7(12 + 1) + 2*1*12) \mod 17 = 4$
$Kw, v = gw(v) = (8 + 7(7 + 1) + 2*1*7) \mod 17 = 10$ FOR U, VALUES OF $\alpha u = (a + b\gamma u) \mod p = 7$ AND $\beta u = (b + c\gamma u) \mod p = 14$ ARE CONFIDENTIALLY HELD ($gu(x) = (7 + 14x) \mod 17$)
FOR V, VALUES OF $\alpha v = (a + b\gamma v) \mod p = 6$ AND $\beta v = (b + c\gamma v) \mod p = 4$ ARE CONFIDENTIALLY HELD ($gu(x) = (6 + 4x) \mod 17$)   652
FOR W, VALUES OF $\alpha w = (a + b\gamma w) \mod p = 15$ AND $\beta w = (b + c\gamma w) \mod p = 9$ ARE CONFIDENTIALLY HELD ($gu(x) = (15 + 9x) \mod 17$)

WHEN U RECEIVES VALUE OF $\gamma v$ = 7 MADE PUBLIC BY V AND V RECEIVES VALUE OF $\gamma u$ = 12 MADE PUBLIC BY U,
SHARED VALUE Ku,v = Kv,u = gu($\gamma v$) = gv($\gamma u$) = 3 OF U AND V IS OBTAINED AND USED AS COMMON KEY SHARED BY U AND V
WHEN U RECEIVES VALUE OF $\gamma w$ = 1 MADE PUBLIC BY W AND W RECEIVES VALUE OF $\gamma u$ = 12 MADE PUBLIC BY U,
SHARED VALUE Ku,w = Kw,u = gu($\gamma w$) = gw($\gamma u$) = 4 OF U AND W IS OBTAINED AND USED AS COMMON KEY SHARED BY U AND W
WHEN W RECEIVES VALUE OF $\gamma v$ = 7 MADE PUBLIC BY V AND V RECEIVES VALUE OF $\gamma w$ = 1 MADE PUBLIC BY W,
SHARED VALUE Kw,v = Kv,w = gw($\gamma v$) = gv($\gamma w$) = 10 OF V AND W IS OBTAINED AND USED AS COMMON KEY SHARED BY W AND V

ENCRYPTION COMMUNICATION SYSTEM, ENCRYPTION COMMUNICATION METHOD, SECURITY CHIP, COMMUNICATION APPARATUS, AND CONTROL METHOD AND CONTROL PROGRAM OF COMMUNICATION APPARATUS

CROSS REFERENCE TO RELATED APPLICATIONS

This application is a National Stage of International Application No. PCT/JP2017/005311 filed Feb. 14, 2017, and claims the benefit of priority from Japanese patent application No. 2016-048244, filed on Mar. 11, 2016, the disclosure of which is incorporated herein in its entirety by reference.

TECHNICAL FIELD

The present invention relates to an encryption communication system, an encryption communication method, a security chip, a communication apparatus, and a control method and control program of the communication apparatus.

BACKGROUND ART

In the above technical field, patent literature 1 discloses a technique of preventing unnecessary leakage of information by embedding a public key and a private key corresponding to it in a TPM (Trusted Platform Module). A technique of encrypting (wrapping) a common key for protecting data by a public key in a TPM and saving, in the TPM, a private key for decrypting (unwrapping) the common key is proposed on page 13 of non-patent literature 1.

CITATION LIST

Patent Literature

Patent literature 1: Japanese Patent Laid-Open No. 2008-35449

Non-Patent Literature

Non-patent literature 1: "The security frontier levelaged by TPM", Japan Electronics and Information Technology Industries Association, TCG Technical Committee, 2007/10/3, http://home.jeita.or.jp/is/committee/infopolicy/tcg/d20071003.pdf

SUMMARY OF THE INVENTION

Technical Problem

In the techniques described in the above literatures, however, it is impossible to prevent leakage of a common key when the common key is used outside a TPM at the time of encryption or decryption by the common key or the generated common key is resident in a TPM.

The present invention enables to provide a technique of solving the above-described problem.

Solution to Problem

One example aspect of the present invention provides an encryption communication system that uses a pair of a first private portion and a first public portion and a pair of a second private portion and a second public portion in a key predistribution system (KPS), comprising:

a ciphertext generator that generates a ciphertext by generating, in a first security chip (TPM: Trusted Platform Module) of a first communication apparatus, a first common key by the first private portion held in the first security chip using the second public portion transmitted from a second communication apparatus as a communication partner, and encrypting a plaintext using the first common key in the first security chip; and a decryptor that generates a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip.

Another example aspect of the present invention provides an encryption communication method that uses a pair of a first private portion and a first public portion and a pair of a second private portion and a second public portion in a key predistribution system (KPS), comprising:

generating a ciphertext by generating, in a first security chip (TPM: Trusted Platform Module) of a first communication apparatus, a first common key by the first private portion held in the first security chip using the second public portion transmitted from a second communication apparatus as a communication partner, and encrypting a plaintext using the first common key in the first security chip; and generating a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip.

Still other example aspect of the present invention provides a communication apparatus comprising a security chip (TPM: Trusted Platform Module),
said security chip comprising:

a private portion holder that holds a private portion in a key predistribution system (KPS);

a common key generator that generates a common key by the held private portion using a public portion in the key predistribution system transmitted from a communication partner; and a ciphertext generator that generates a ciphertext by encrypting a plaintext using the common key.

Still other example aspect of the present invention provides a method of controlling a communication apparatus that comprises a security chip (TPM: Trusted Platform Module), comprising:

holding, in a private portion holder of the security chip, a private portion in a key predistribution system (KPS);

generating, in the security chip, a common key by the held private portion using a public portion in the key predistribution system transmitted from a communication partner; and generating, in the security chip, a ciphertext by encrypting a plaintext using the common key.

Still other example aspect of the present invention provides a program of controlling a communication apparatus that comprises a security chip (TPM: Trusted Platform Module), for causing a computer to execute a method, comprising:

holding, in a private portion holder of the security chip, a private portion in a key predistribution system (KPS);

generating, in the security chip, a common key by the held private portion using a public portion in the key predistribution system transmitted from a communication partner; and generating, in the security chip, a ciphertext by encrypting a plaintext using the common key.

Still other example aspect of the present invention provides a communication apparatus comprising a security chip (TPM: Trusted Platform Module), said security chip comprising:

a private portion holder that holds a private portion in a key predistribution system (KPS);

a common key generator that generates a common key by the held private portion using a public portion in the key predistribution system transmitted from a communication partner; and a decryptor that generates a plaintext by decrypting, using the common key, a ciphertext received from the communication partner.

Still other example aspect of the present invention provides a method of controlling a communication apparatus that comprises a security chip (TPM: Trusted Platform Module), comprising:

holding, in a private portion holder of the security chip, a private portion in a key predistribution system (KPS);

generating, in the security chip, a common key by the held private portion using a public portion in the key predistribution system transmitted from a communication partner; and generating a plaintext by decrypting, in the security chip a ciphertext received from the communication partner using the common key.

Still other example aspect of the present invention provides a program of controlling a communication apparatus that comprises a security chip (TPM: Trusted Platform Module), for causing a computer to execute a method, comprising:

holding, in a private portion holder of the security chip, a private portion in a key predistribution system (KPS);

generating, in the security chip, a common key by the held private portion using a public portion in the key predistribution system transmitted from a communication partner; and generating a plaintext by decrypting, in the security chip, a ciphertext received from the communication partner using the common key.

Still other example aspect of the present invention provides a security chip (TPM: Trusted Platform Module) of a communication apparatus, comprising:

a private portion holder that holds a private portion in a key predistribution system (KPS);

a common key generator that generates a common key in accordance with the key predistribution system based on the held private portion and a public portion in the key predistribution system transmitted from a communication partner, and a ciphertext generator that generates a ciphertext by receiving an encryption command attached with a plaintext and the public portion transmitted from the communication partner, causing said common key generator to generate the common key, and encrypting the plaintext using the common key.

Still other example aspect of the present invention provides a security chip (TPM: Trusted Platform Module) of a communication apparatus, comprising:

a private portion holder that holds a private portion in a key predistribution system (KPS), a common key generator that generates a common key in accordance with the key predistribution system based on the held private portion and a public portion in the key predistribution system transmitted from a communication partner, and a decryptor that generates a plaintext by receiving a decryption command attached with a ciphertext and the public portion transmitted from the communication partner, causing said common key generator to generate the common key, and decrypting the ciphertext using the common key.

Advantageous Effects of Invention

According to the present invention, it is possible to prevent leakage of a common key and improve the confidentiality of communication information.

BRIEF DESCRIPTION OF DRAWINGS

FIG. 3A is a block diagram showing the schematic arrangement of the encryption communication system according to the second example embodiment of the present invention;

FIG. 4A is a block diagram showing the hardware arrangement of the communication apparatus according to the second example embodiment of the present invention;

FIG. 5A is a block diagram showing the hardware arrangement of a security chip (TPM) according to the second example embodiment of the present invention;

FIG. 5D is a flowchart illustrating the procedure of the decryption processing of the security chip (TPM) according to the second example embodiment of the present invention;

FIG. 6A is a sequence chart showing the operation procedure of the encryption processing of an encryption communication system according to a technical premise;

FIG. 6D is a view showing an example of an algorithm of the key predistribution system (KPS) according to the technical premise;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An encryption communication system 100 according to the first example embodiment of the present invention will be described with reference to FIG. 1. The encryption communication system 100 is a system that performs encryption communication between communication apparatuses using a pair of the first private portion and the first public portion and a pair of the second private portion and the second public portion in the key predistribution system (KPS).

Figure 1:
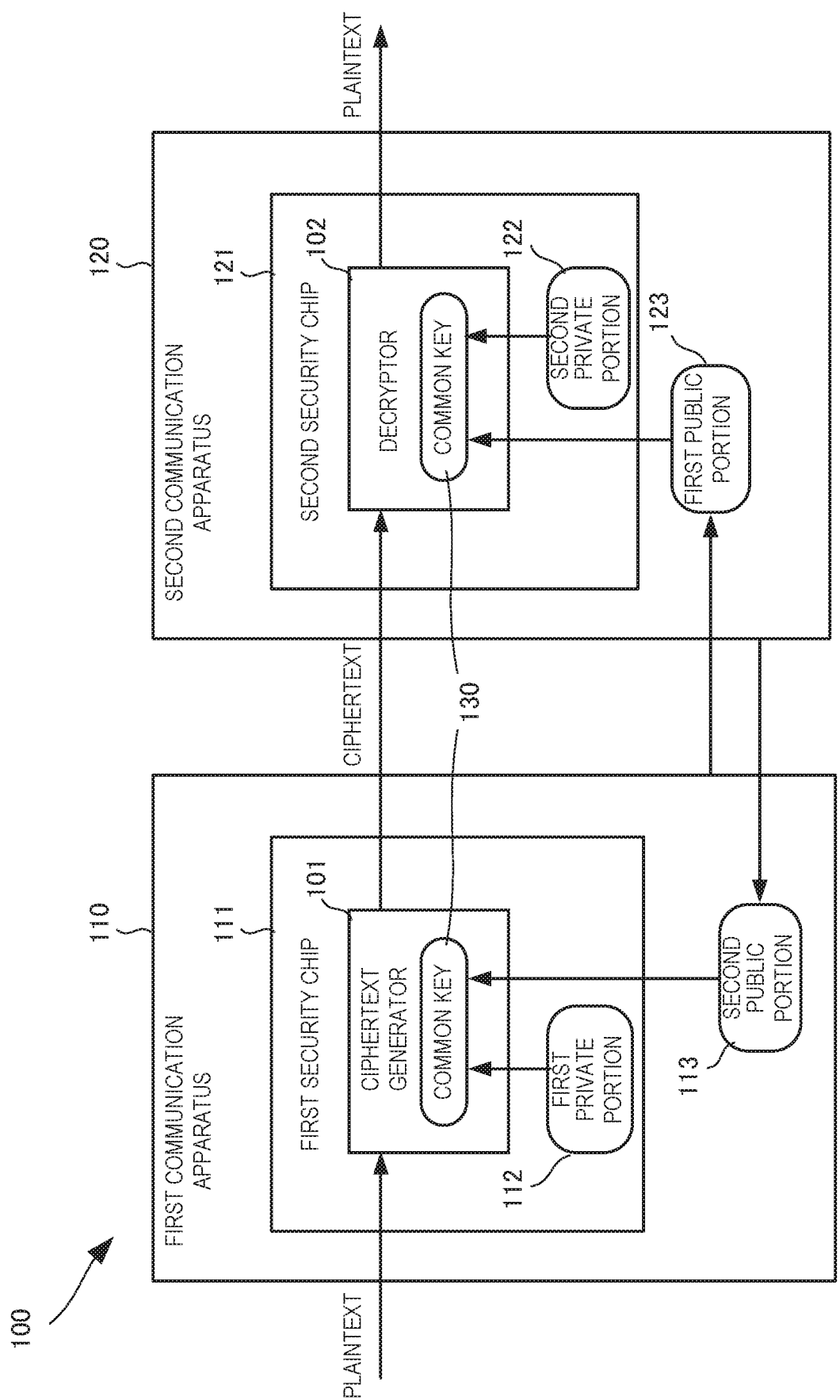
FIG. 1 is a block diagram showing the arrangement of an encryption communication system according to the first example embodiment of the present invention.

As shown in FIG. 1, the encryption communication system 100 includes a ciphertext generator 101 and a decryptor 102. The ciphertext generator 101 generates a ciphertext by generating, in a first security chip (TPM: Trusted Platform Module) 111 of a first communication apparatus 110, a common key 130 by a first private portion 112 held in the first security chip 111 using a second public portion 113 transmitted from a second communication apparatus 120 as a communication partner, and encrypting a plaintext based on the common key 130 in the first security chip 111. The decryptor 102 generates a plaintext by generating, in a second security chip 121 of the second communication apparatus 120, the common key 130 by a second private portion 122 held in the second security chip 121 using a first public portion 123 transmitted from the first communication apparatus 110 as a communication partner, and decrypting, based on the common key 130 in the second security chip 121, the ciphertext received from the first communication apparatus 110. According to this example embodiment, the first communication apparatus generates the common key from the first private portion and the second public portion in the TPM at the time of encryption, and performs encryption in the TPM, and the second communication apparatus generates the common key from the second private portion and the first public portion in the TPM at the time of decryption, and performs decryption in the TPM, thereby preventing leakage of the common key and improving the confidentiality of communication information.

Second Example Embodiment

An encryption communication system according to the second example embodiment of the present invention will be described next. The encryption communication system according to this example embodiment transmits, to a communication partner, a public portion by embedding, in a TPM, a distributed private portion in the key predistribution system. Then, the encryption communication system generates a common key in the TPM at the time of encryption or decryption, performs encryption or decryption in the TPM, and discards the common key after the end of encryption or decryption.

<<Technical Premise>>

An arrangement and operation according to a technical premise will briefly be described with reference to FIGS. 6A to 6D.

(Encryption Processing Sequence)

FIG. 6A is a sequence chart showing the operation procedure of the encryption processing of an encryption communication system 600 according to the technical premise.

In step S611, an encryption side CPU 611 of an encryption side apparatus 610 requests an encryption side TPM 612 to load a common key. In step S613, the encryption side TPM 612 of the encryption side apparatus 610 transfers the common key to the encryption side CPU 611.

At this time, the common key is made public to the encryption side CPU 611. In step S615, the encryption side CPU 611 encrypts a plaintext message by the loaded common key. In step S617, the encryption side CPU 611 transmits the encrypted message to a decryption side CPU 621 of a decryption side apparatus 620. In step S619, the encryption side CPU 611 discards the loaded common key. During this processing (see 601 in FIG. 6A), the common key continuously exists in the encryption side CPU 611, leading to an increase in probability of leakage of the common key.

(Decryption Processing Sequence)

Figure 6B:
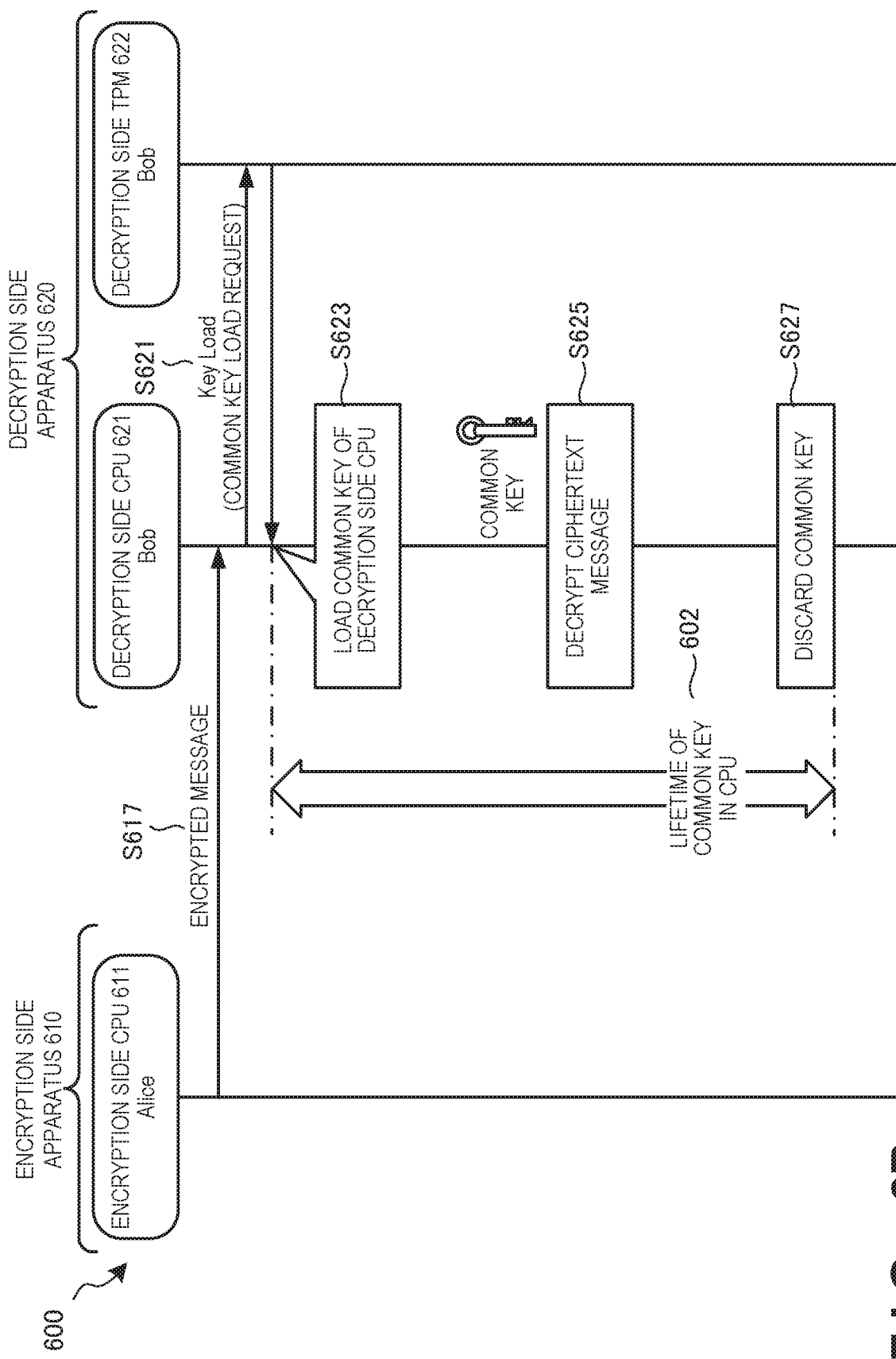
FIG. 6B is a sequence chart showing the operation procedure of the decryption processing of the encryption communication system according to the technical premise.

FIG. 6B is a sequence chart showing the operation procedure of the decryption processing of the encryption communication system 600 according to the technical premise.

In step S617 described above, the encryption side CPU 611 of the encryption side apparatus 610 transmits the encrypted message to the decryption side CPU 621 of the decryption side apparatus 620.

Upon receiving the encrypted message, the decryption side CPU 621 of the decryption side apparatus 620 requests, in step S621, a decryption side TPM 622 to load a common key. In step S623, the decryption side TPM 622 of the decryption side apparatus 620 transfers the common key to the decryption side CPU 621.

At this time, the common key is made public to the decryption side CPU 621. In step S625, the decryption side CPU 621 decrypts the ciphertext message by the loaded common key. In step S627, the decryption side CPU 621 discards the loaded common key. During this processing (see 602 in FIG. 6B), the common key continuously exists in the decryption side CPU 621, leading to an increase in probability of leakage of the common key.

(Arrangement of Security Chip)

Figure 6C:
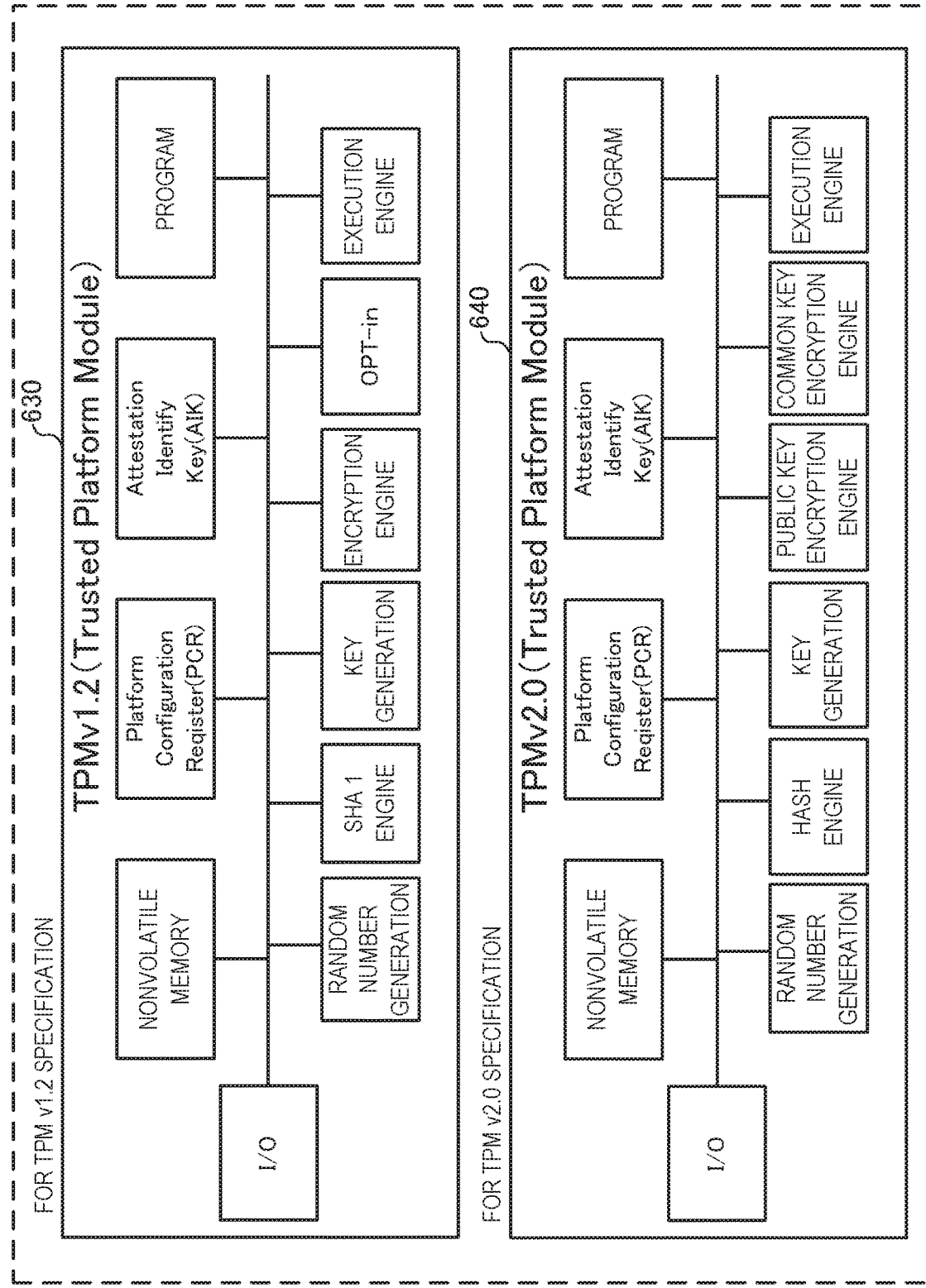
FIG. 6C is a block diagram showing the hardware arrangement of a security chip (TPM) according to the technical premise.

FIG. 6C is a block diagram showing the hardware arrangement of a security chip (TPM) 630/640 according to the technical premise.

FIG. 6C shows the arrangement 630 complying with the TPM v1.2 specification and the arrangement 640 complying with the TPM v2.0 specification by TCG (Trusted Computing Group). Note that in this example embodiment, a function of holding a KPS private portion in a nonvolatile memory, a function of generating a common key and performing encrypting by an encryption command Encrypt, and a function of generating a common key and performing decrypting by a decryption command Decrypt are added to each of these arrangements.

(Example of Algorithm of Key Predistribution System)

FIG. 6D is a view showing an example of an algorithm 650 of the key predistribution system (KPS) according to the technical premise. Note that the algorithm 650 of the key predistribution system (KPS) shown in FIG. 6D is an example called the Blom algorithm. A usable algorithm of the key predistribution system (KPS) according to this example embodiment is not limited to that shown in FIG. 6D.

An upper half portion (logic) of FIG. 6D proves that a number of pairs each including (KPS public portion, KPS private portion) are generated based on the Blom algorithm. That is, in the algorithm 650 of the key predistribution system (KPS), a KPS private portion is calculated in correspondence with a KPS public portion, and the KPS public portion is transmitted to a communication destination, thereby calculating the same common key in a transmission source and a transmission destination.

A lower half portion (practical example) of FIG. 6D shows that the above logic is correct based on the Blom algorithm in accordance with simple practical values. For example, ($\gamma u=12$, $\gamma v=7$, $\gamma w=1$) 651 indicates KPS public portions (public values) of apparatuses U, V, and W. In correspondence with the KPS public portions, KPS private portions (private values) are generated. In FIG. 6D, ($\alpha u$, $\beta u$)=(7, 14), ($\alpha v$, $\beta v$)=(6, 4), and ($\alpha w$, $\beta w$)=(15, 9) are the KPS private portions (private values). With the KPS private portions (private values), $gu(x)=7+14x$, $gv(x)=6+4x$, $gw(x)=15+9x$ are obtained. The common keys between the apparatuses U and V, between the apparatuses U and W, and between the apparatuses V and W are "3", "4", and "10", respectively, thereby enabling encryption communication while maintaining the confidentiality.

Description of Example Embodiment

An arrangement and operation according to this example embodiment will be described in detail below with reference to FIGS. 2A to 5D.

<<Encryption Communication System>>

An encryption communication system 200 according to this example embodiment will be described with reference to FIGS. 2A to 3A.

(Operation Preparation Processing Sequence)

Figure 2A:
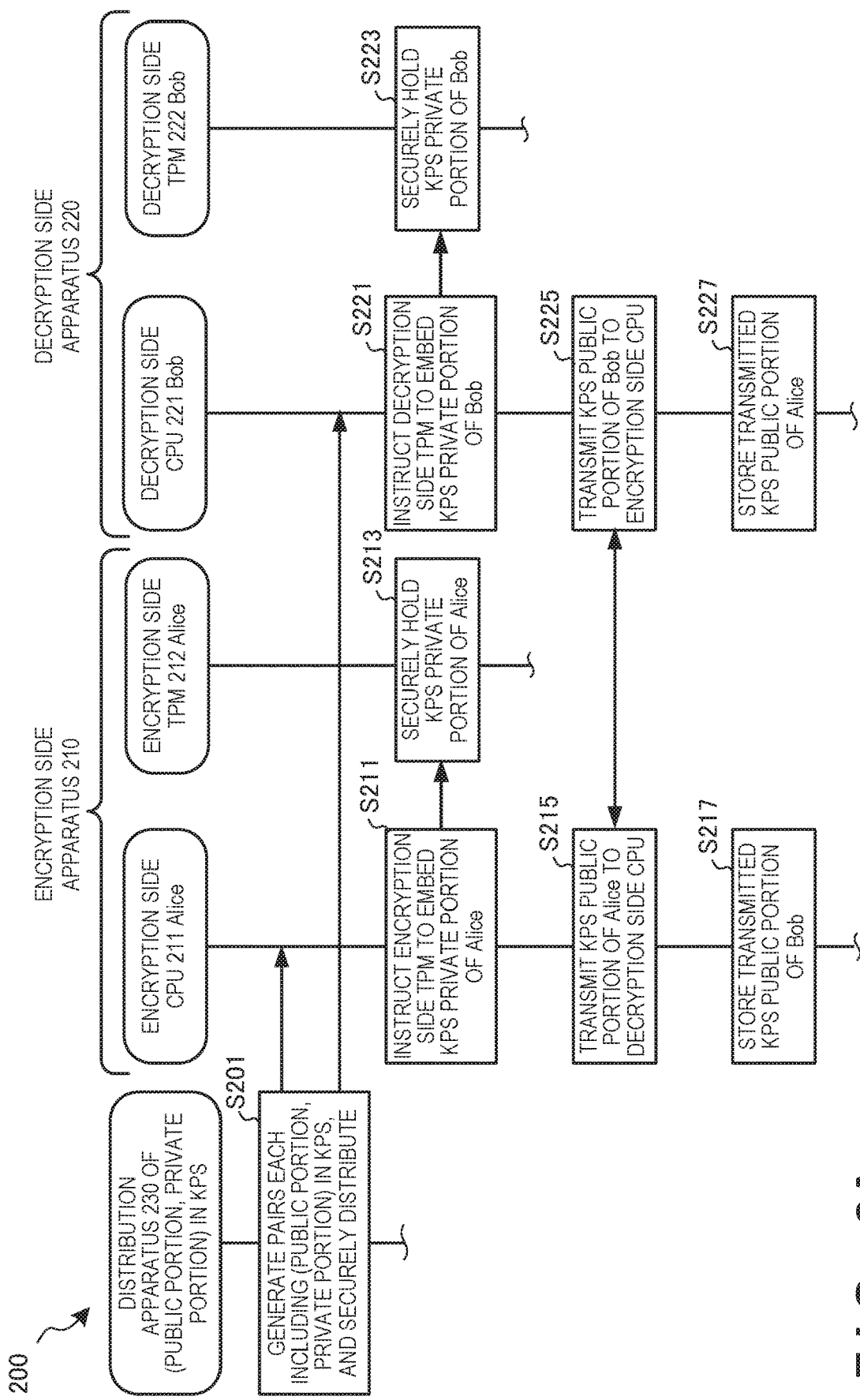
FIG. 2A is a sequence chart showing the operation procedure of the operation preparation processing of an encryption communication system according to the second example embodiment of the present invention.

FIG. 2A is a sequence chart showing the operation procedure of the operation preparation processing of the encryption communication system 200 according to this example embodiment.

In step S201, a distribution apparatus 230 that distributes a pair of (public portion, private portion) in KPS distributes pairs each including (public portion, private portion) in KPS to an encryption side CPU 211 of an encryption side apparatus 210 (to be referred to as Alice hereinafter) and a decryption side CPU 221 of a decryption side apparatus 220 (to be referred to as Bob hereinafter), respectively. Note that FIG. 2A exemplifies an example of distributing, from the distribution apparatus 230, pairs each including (public portion, private portion) in KPS. However, the encryption side CPU 211 or the decryption side CPU 221 may transmit the public portion, and receive the private portion.

In step S211, the encryption side CPU 211 instructs an encryption side TPM 212 to embed the received KPS private portion and hold the private portion. In step S213, the encryption side TPM 212 securely holds the KPS private portion at a predetermined position in a nonvolatile memory.

In step S215, the encryption side CPU 211 transmits the received KPS public portion to the decryption side CPU 221, and receives a decryption side KPS public portion transmitted from the decryption side CPU 221. In step S217, the encryption side CPU 211 stores the received decryption side KPS public portion.

On the other hand, in step S221, the decryption side CPU 221 instructs a decryption side TPM 222 to embed the received KPS private portion. In step S223, the decryption side TPM 222 securely holds the KPS private portion at a predetermined position in a nonvolatile memory.

In step S225, the decryption side CPU 221 transmits the received KPS public portion to the encryption side CPU 211, and receives the encryption side KPS public portion transmitted from the encryption side CPU 211. In step S227, the decryption side CPU 221 stores the received encryption side KPS public portion.

(Encryption Processing Sequence)

Figure 2B:
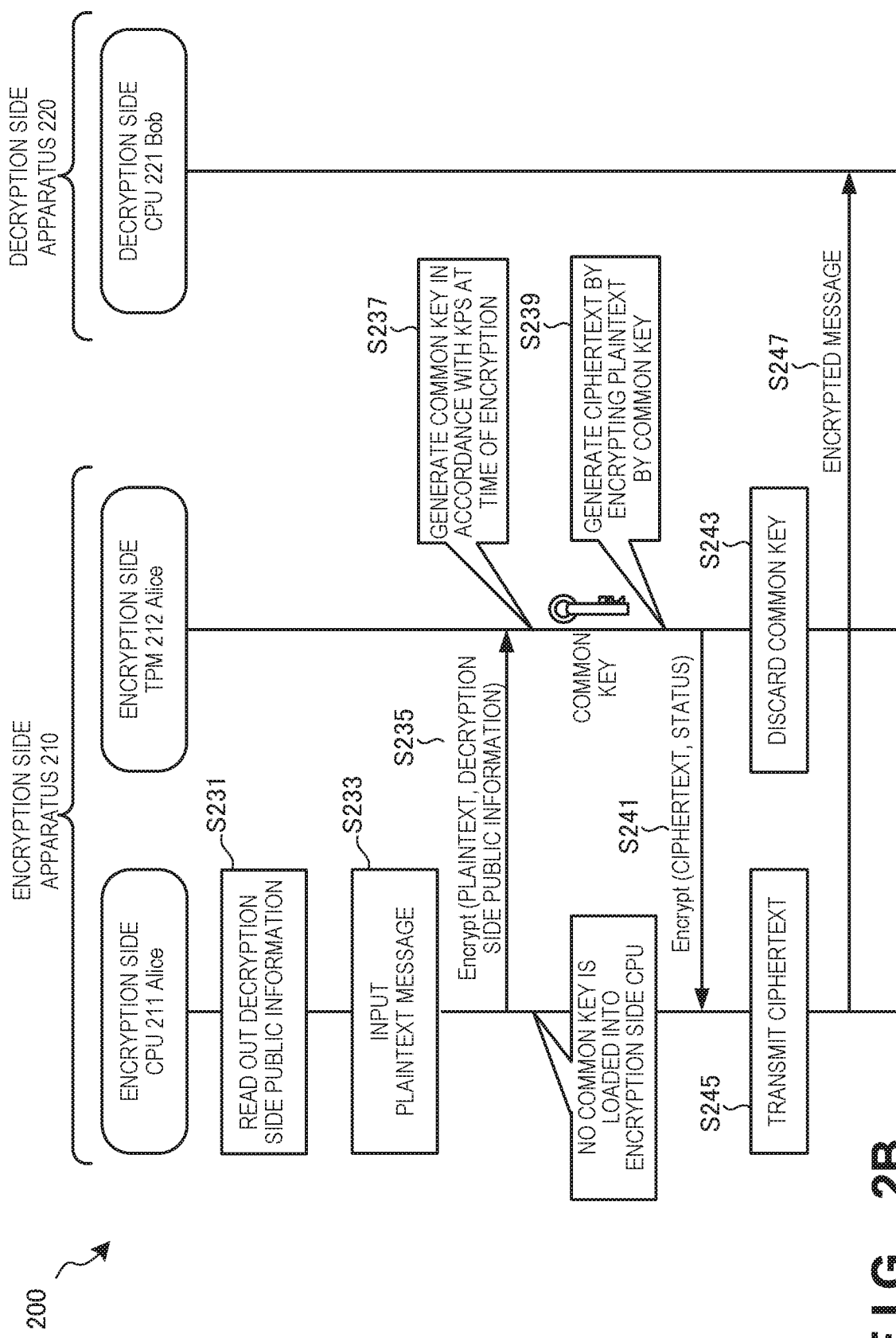
FIG. 2B is a sequence chart showing the operation procedure of the encryption processing of the encryption communication system according to the second example embodiment of the present invention.

FIG. 2B is a sequence chart showing the operation procedure of the encryption processing of the encryption communication system 200 according to this example embodiment.

In step S231, the encryption side CPU 211 reads out the stored public information (public portion) of a decryption side. In step S233, the encryption side CPU 211 acquires a plaintext message, and inputs it to the encryption side TPM 212. That is, in step S235, the encryption side CPU 211 transmits, to the encryption side TPM 212, an encryption command attached with the plaintext and the decryption side public information, Encrypt (plaintext, public information of decryption side).

The encryption side TPM 212 analyzes the received encryption command Encrypt (plaintext, public information of decryption side), and determines to "generate a common key by the private portion held in the encryption side TPM 212 using the attached decryption side public information, encrypt the attached plaintext by the common key, and return a ciphertext to the encryption side CPU 211". The encryption side TPM 212 generates, in step S237, a common key in accordance with the key predistribution system (KPS), and generates, in step S239, a ciphertext by encrypting the plaintext by the common key.

In step S241, the encryption side TPM 212 returns, to the encryption side CPU 211, an encryption response command Encrypt (ciphertext, status) attached with the ciphertext encrypted by the common key and the status of the processing in the encryption side TPM 212. In step S243, the encryption side TPM 212 discards the common key generated for encryption.

In step S245, the encryption side CPU 211 transmits, to the decryption side CPU 221 of the decryption side apparatus 220, the ciphertext returned from the encryption side TPM 212. In step S247, the ciphertext is transmitted as an encrypted message to the decryption side CPU 221.

(Decryption Processing Sequence)

Figure 2C:
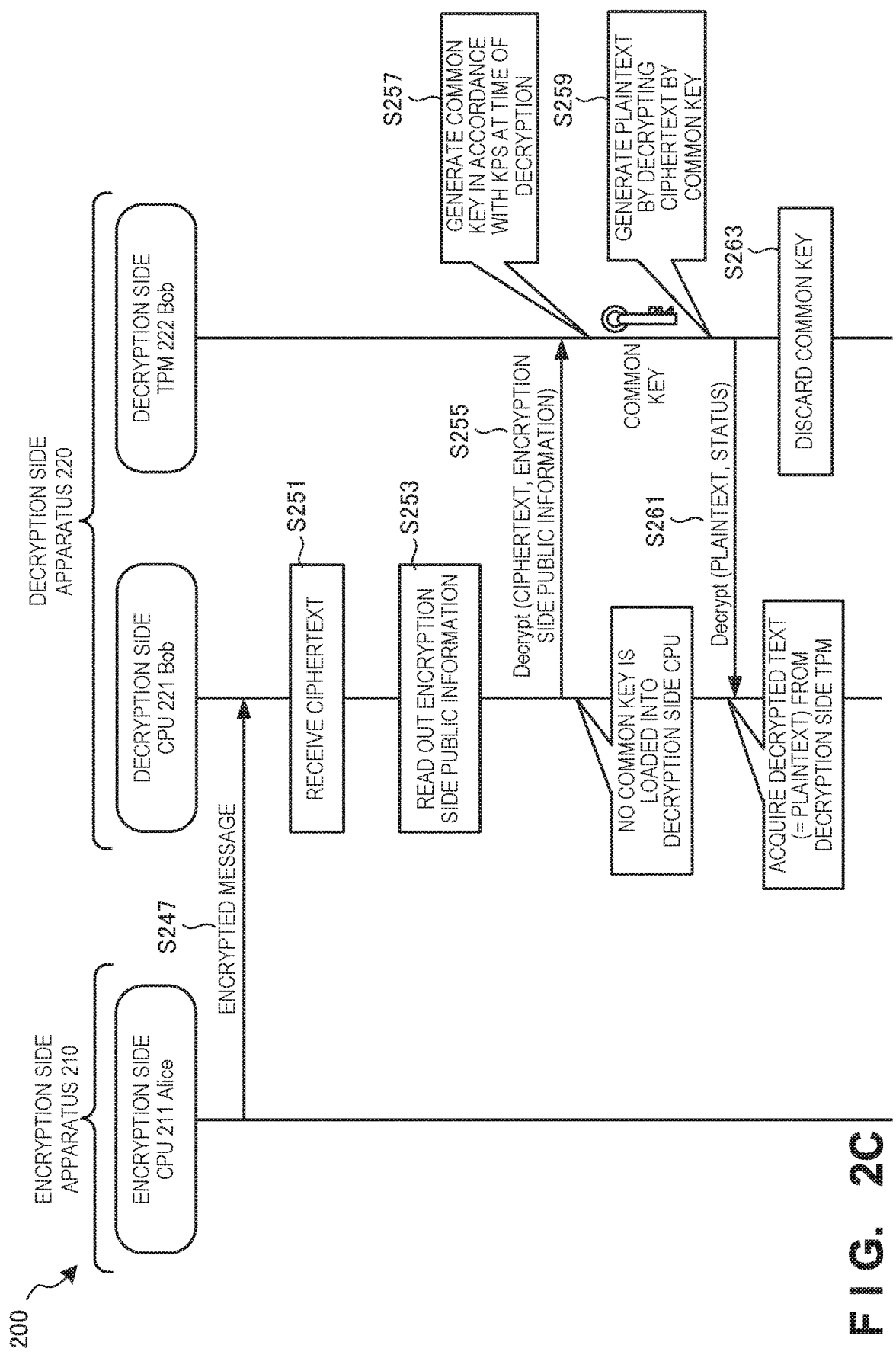
FIG. 2C is a sequence chart showing the operation procedure of the decryption processing of the encryption communication system according to the second example embodiment of the present invention.

FIG. 2C is a sequence chart showing the operation procedure of the decryption processing of the encryption communication system 200 according to this example embodiment.

In step S251, the decryption side CPU 221 receives the ciphertext from the encrypted message transmitted from the encryption side CPU 211 in step S247. In step S253, the decryption side CPU 221 reads out the stored public information (public portion) of an encryption side. In step S255, the decryption side CPU 221 transmits, to the decryption side TPM 222, a decryption command attached with the ciphertext and encryption side public information, Decrypt (ciphertext, public information of encryption side).

The decryption side TPM 222 analyzes the received decryption command Decrypt (ciphertext, public information of encryption side), and determines to "generate a common key by the private portion held in the decryption side TPM 222 using the attached encryption side public information, decrypt the attached ciphertext by the common key, and return a plaintext to the decryption side CPU 221". The decryption side TPM 222 generates, in step S257, a common key in accordance with the key predistribution system (KPS), and generates, in step S259, a plaintext by decrypting the ciphertext by the common key.

In step S261, the decryption side TPM 222 returns, to the decryption side CPU 221, a decryption response command Decrypt (plaintext, status) attached with the plaintext decrypted by the common key and the status of the processing in the decryption side TPM 222. In step S263, the decryption side TPM 222 discards the common key generated for decryption.

(System Arrangement)

FIG. 3A is a block diagram showing the schematic arrangement of the encryption communication system 200 communicated via a connection portion 330 according to this example embodiment. Note that FIG. 3A does not illustrate components out of communication control in each communication apparatus.

The encryption side apparatus 210 includes the above-described CPU 211 and TPM 212. The CPU 211 includes an application 311, an encryption function module 312, and an I2C (Inter Integrated Circuit) 313. The application 311 is mainly formed from software that provides a service including communication with the decryption side apparatus 220. The encryption function module 312 includes software for performing encryption processing using the TPM 212 in accordance with the operation of the application 311. The I2C 313 operates as a GPIO (General Purpose Input/Output) connected to the encryption side TPM 212 by a serial interface.

The decryption side apparatus 220 includes the above-described CPU 221 and TPM 222. The CPU 221 includes an application 321, a decryption function module 322, and an I2C 323. The application 321 is mainly formed from software that provides a service including communication with the encryption side apparatus 210. The decryption function module 322 includes software for performing decryption processing using the TPM 222 in accordance with the operation of the application 321. The I2C 323 operates as a GPIO connected to the TPM 222 by a serial interface having two signal lines (SCL: Serial Clock and SDA: Serial Data).

<<Communication Apparatus>>

The communication apparatus including the encryption side apparatus 210 and the decryption side apparatus 220 according to this example embodiment will be described with reference to FIGS. 3B to 4D.

(Schematic Arrangement)

Figure 3B:
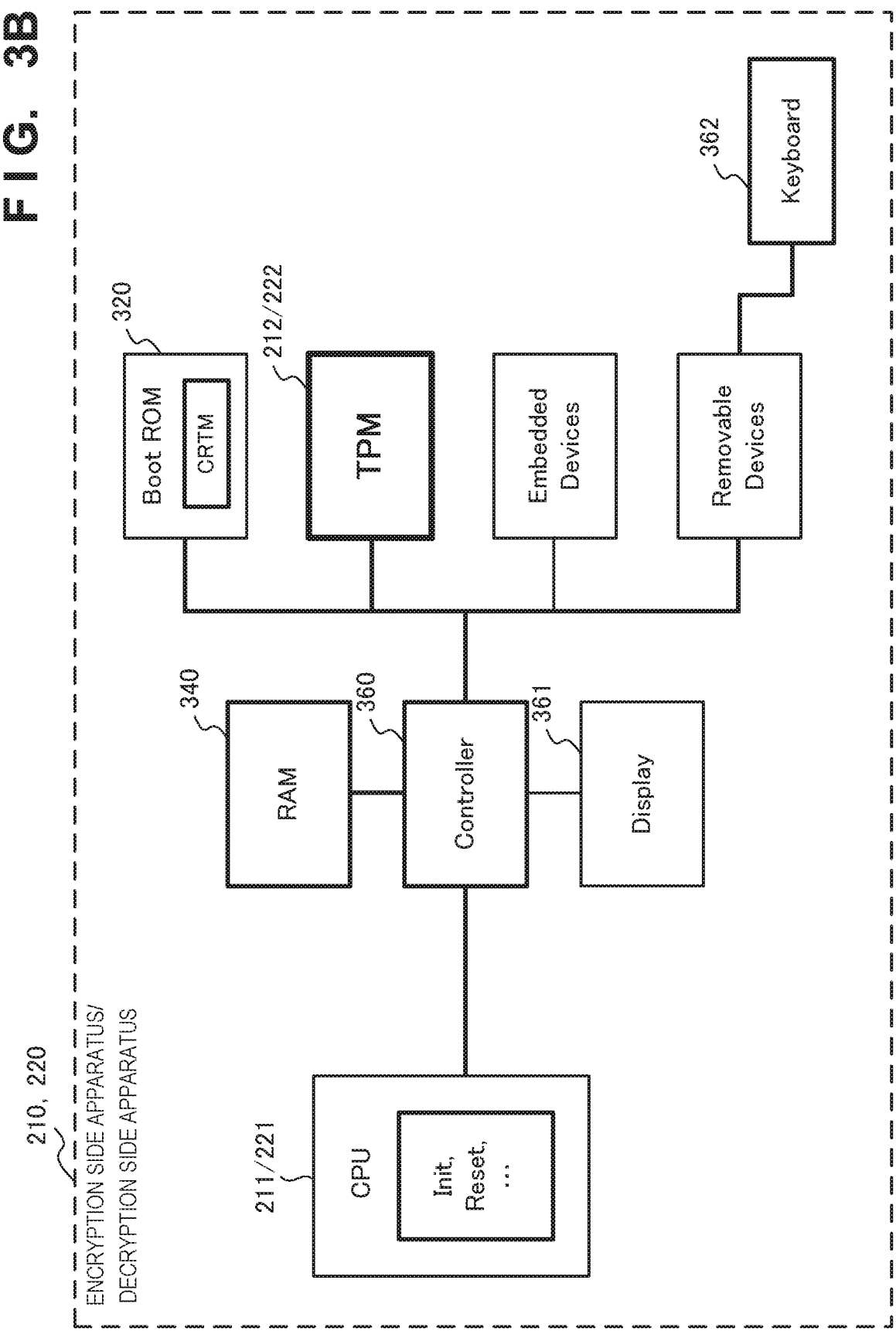
FIG. 3B is a block diagram showing the schematic arrangement of a communication apparatus according to the second example embodiment of the present invention.

FIG. 3B is a block diagram showing the schematic arrangement of the communication apparatus 210/220 according to this example embodiment. Note that FIG. 3B shows the general arrangement of the communication apparatus including the TPM 212/222, and the communication apparatus according to this example embodiment is not limited to the arrangement shown in FIG. 3B.

The communication apparatus 210/220 includes the CPU 211/221, a ROM 320, a RAM 340, a controller 360, a display 361, and a keyboard 362. Note that a detailed description of other illustrated components will be omitted.

The CPU 211/221 is a central processing unit that controls the communication apparatus 210/220. The ROM 320 is a storage unit that nonvolatilely holds a boot program and fixed values. The RAM 340 is a storage unit used as a rewritable temporary storage by the CPU 211/221. The controller 360 connects a CPU bus and an IO bus to control a peripheral apparatus (ID device).

(Software Arrangement)

Figure 3C:
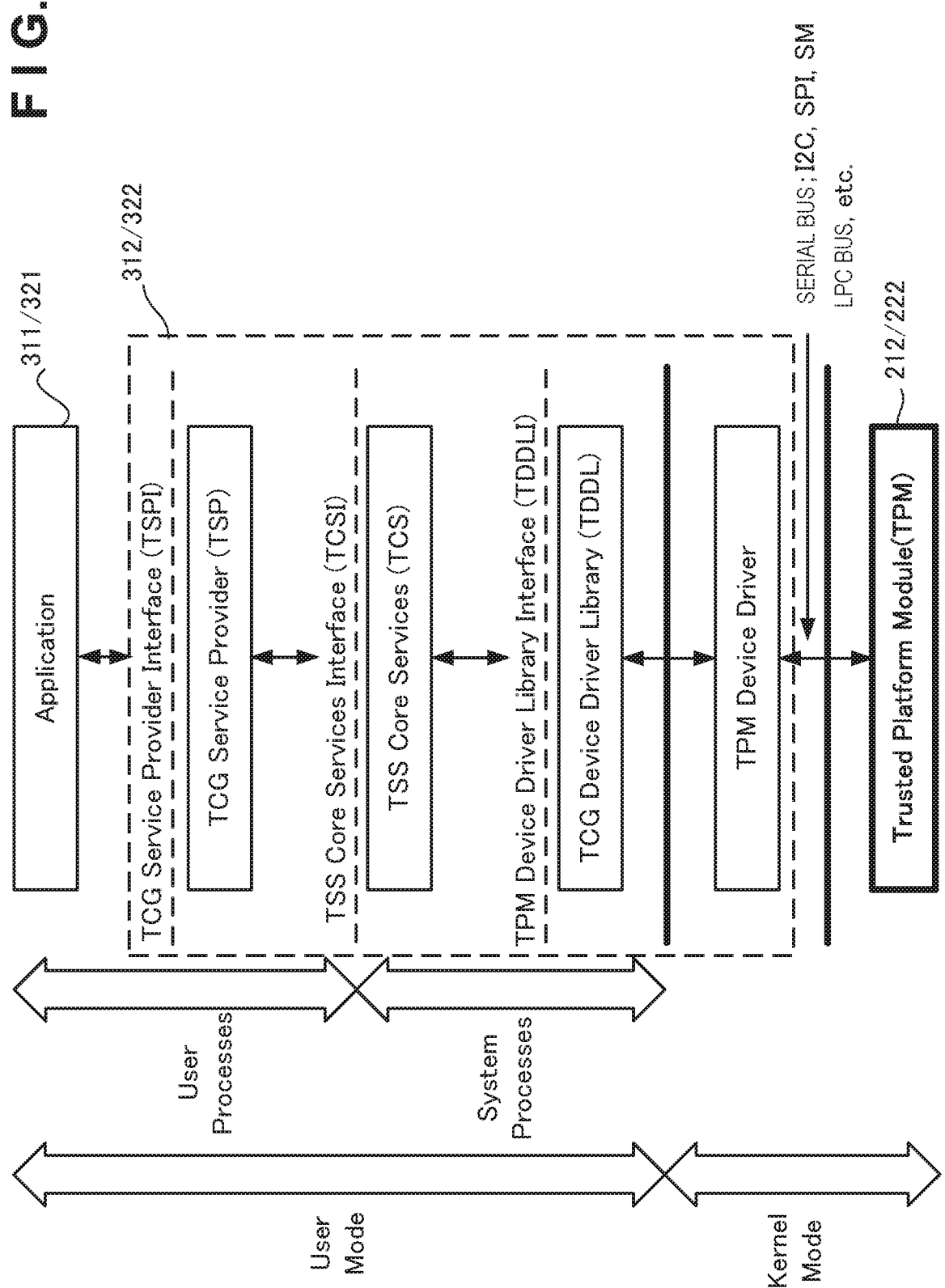
FIG. 3C is a block diagram showing the software layer arrangement of the communication apparatus according to the second example embodiment of the present invention.

FIG. 3C is a block diagram showing the software layer arrangement of the communication apparatus 210/220 according to this example embodiment. Note that FIG. 3C shows the general software arrangement of the communication apparatus including the TPM 212/222, and the communication apparatus according to this example embodiment is not limited to the software layer arrangement shown in FIG. 3C.

As shown in FIG. 3A, the software arrangement of the communication apparatus 210/220 generally includes the application 311/321, and the encryption function module 312/decryption function module 322. The encryption function module 312/decryption function module 322 includes TSP (TCG Service Provider) connected to the application 311/321 via TSPI (TCG Service Provider Interface). The encryption function module 312/decryption function module 322 includes TCS (TSS Core Services) connected to TSP via TCSI (TSS Core Services Interface). The encryption function module 312/decryption function module 322 includes TDDL (TCG Device Driver Library) connected to TCSI via TDDLI (TPM Device Driver Library Interface). The encryption function module 312/decryption function module 322 includes TDD (TPM Device Driver) that controls driving of the TPM 212/222.

(Hardware Arrangement)

FIG. 4A is a block diagram showing the hardware arrangement of the communication apparatus 210/220 according to this example embodiment.

In FIG. 4A, the CPU 211/221 is an arithmetic control processor, and implements the functional components shown in FIGS. 3A to 3C by executing a program. The ROM 320 stores permanent data such as initial data and a program, and programs. A communication controller 430 controls communication with a server or another communication apparatus via a network. The input/output interface 360 controls input/output of the display and keyboard.

The RAM 340 is a random access memory used as a temporary storage work area by the CPU 211/221. An area to store data necessary for implementation of the example embodiment is allocated to the RAM 340. A plaintext is a text before encryption in the case of the encryption side apparatus 210. A ciphertext encrypted from a plaintext is a text after encryption, that has been generated from the plaintext by the encryption processing of this example embodiment in the case of the encryption side apparatus 210. A received ciphertext is an encrypted text transmitted from the encryption side apparatus 210 in the case of the decryption side apparatus 220. A plaintext decrypted from a ciphertext is a text decrypted from the ciphertext by the decryption processing of this example embodiment in the case of the decryption side apparatus 220. Transmission/reception data is message data exchanged with a server or another communication apparatus via the communication controller 430. Input/output data is data exchanged with an input/output device via the input/output interface 360.

A storage 450 stores a database, various parameters, or the following data or programs necessary for implementation of the example embodiment. A public information holder of a communication partner 451 holds a KPS public portion that is transmitted from the communication apparatus as the communication partner and used to generate a common key at the time of encryption or decryption. The storage 450 holds the following programs. A communication apparatus control program is a program that controls the overall communication apparatus 210/220. A KPS private portion embedding module is a module for embedding a distributed KPS private portion in the TPM. A KPS public portion transmission module is a module for transmitting a distributed KPS public portion to the communication apparatus as the communication partner. Note that the KPS private portion embedding module and the KPS public portion transmission module may be integrated into an operation preparation module. A ciphertext transmission module is a module that generates, in the TPM, a common key from a KPS private key and a KPS public key transmitted from the communication partner, encrypts the plaintext by the common key, and transmits a ciphertext to the communication apparatus as the communication partner. A ciphertext decryption module is a module that generates, in the TPM, a common key from the KPS private key and the KPS public key transmitted from the communication partner, decrypts, by the common key, the ciphertext received from the communication partner, and generates the original plaintext.

The display 361, the operation unit 362, and the TPM 212/222 are connected to the input/output interface 360. Note that the TPM 212/222 may be connected by another interface.

Note that programs and data that are associated with the general-purpose functions of the communication apparatus 210/220 and other feasible functions are not shown in the RAM 340 or the storage 450 of FIG. 4A.

(Operation Preparation Processing Procedure)

Figure 4B:
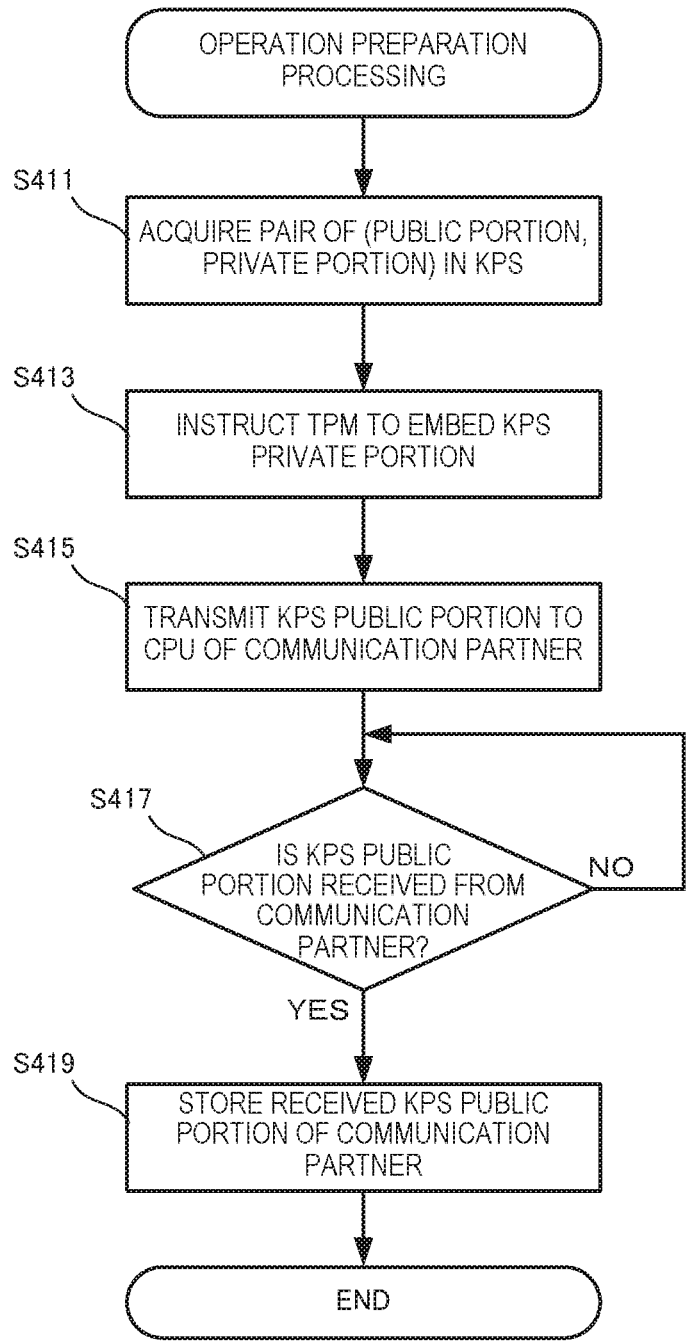
FIG. 4B is a flowchart illustrating the procedure of the operation preparation processing of the communication apparatus according to the second example embodiment of the present invention.

FIG. 4B is a flowchart illustrating the procedure of the operation preparation processing of the communication apparatus 210/220 according to this example embodiment. This flowchart is executed by the CPU 211/221 of FIG. 4A using the RAM 340, thereby implementing the functional components shown in FIGS. 3A to 3C. Note that the following processing procedure of the communication apparatus 210/220 will be explained on the assumption that the communication apparatus 210/220 has both an encryption processing function and a decryption processing function. In fact, however, there are also apparatuses dedicated for an encryption side apparatus and decryption side apparatus, and the present invention includes these apparatuses.

In step S411, the communication apparatus 210/220 acquires a pair of (public portion, private portion) in KPS. Note that as described above, a private portion may be acquired based on a public portion. In step S413, the communication apparatus 210/220 instructs the TPM to embed the KPS private portion. In step S415, the communication apparatus 210/220 transmits the KPS public portion to the CPU of the communication partner.

In step S417, the communication apparatus 210/220 waits for reception of the KPS public portion from the communication partner. If the KPS public portion is received, the communication apparatus 210/220 stores the received KPS public portion of the communication partner in step S419.

(Ciphertext Transmission Processing Procedure)

Figure 4C:
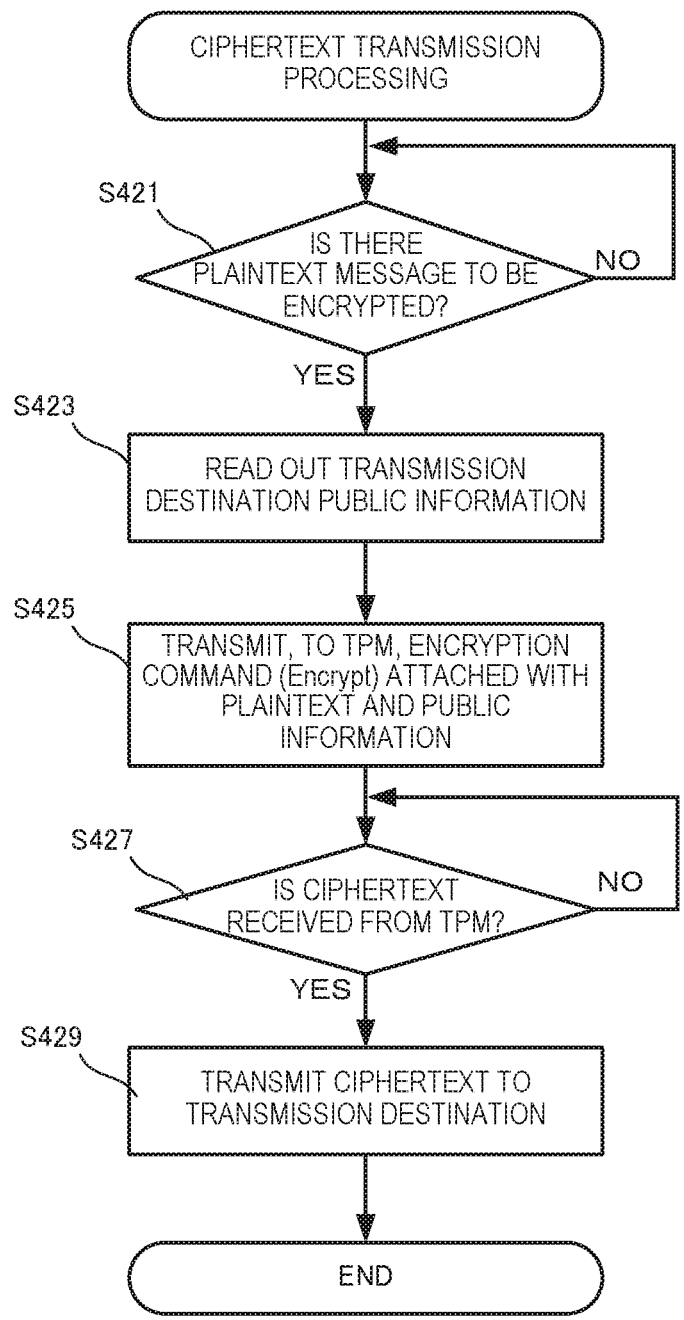
FIG. 4C is a flowchart illustrating the procedure of the ciphertext transmission processing of the communication apparatus according to the second example embodiment of the present invention.

FIG. 4C is a flowchart illustrating the procedure of the ciphertext transmission processing of the communication apparatus 210/220 according to this example embodiment. This flowchart is executed by the CPU 211/221 of FIG. 4A using the RAM 340, thereby implementing the functional components shown in FIGS. 3A to 3C.

In step S421, the communication apparatus 210/220 determines whether there is a plaintext message to be encrypted. If there is a plaintext message to be encrypted, the communication apparatus 210/220 reads out the stored public information (public portion) of a transmission destination in step S423. In step S425, the communication apparatus 210/220 transmits, to the TPM, an encryption command Encrypt attached with the plaintext and the public information.

In step S427, the communication apparatus 210/220 waits for return of a ciphertext from the TPM. If a ciphertext is returned from the TPM, the communication apparatus 210/220 transmits the ciphertext to the transmission destination in step S429.

(Ciphertext Decryption Processing Procedure)

Figure 4D:
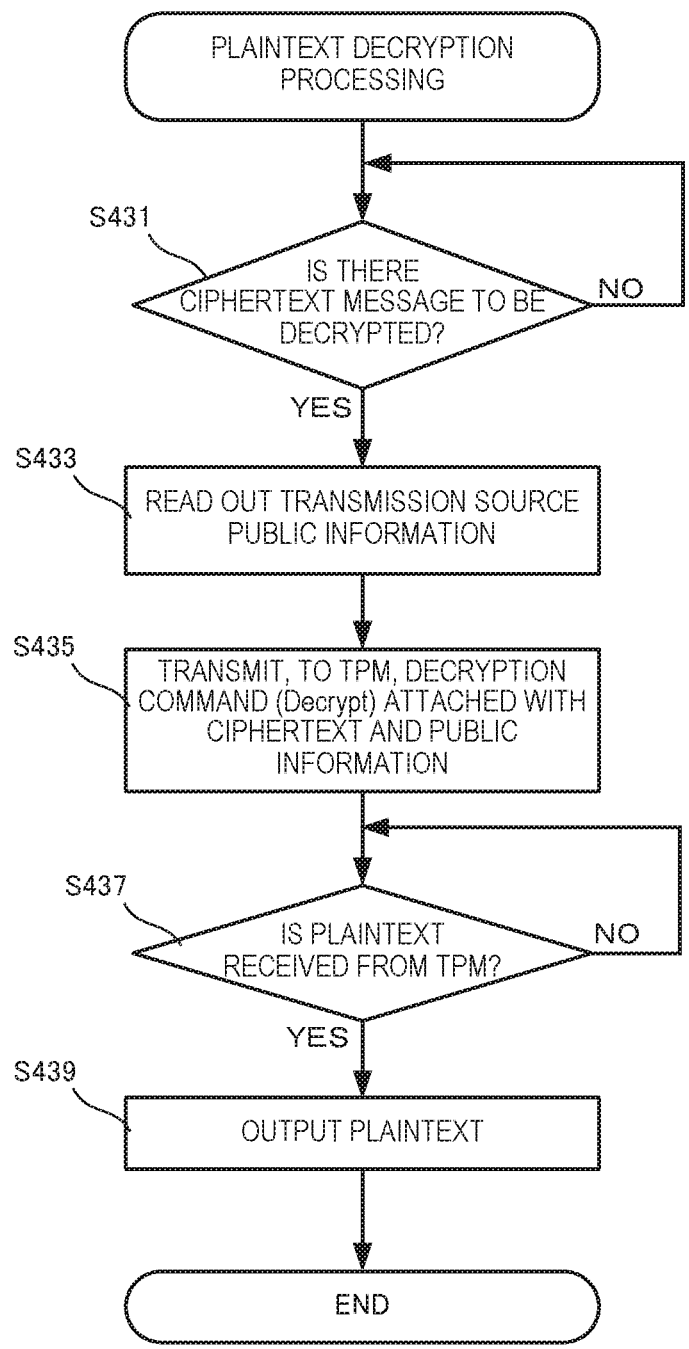
FIG. 4D is a flowchart illustrating the procedure of the plaintext decryption processing of the communication apparatus according to the second example embodiment of the present invention.

FIG. 4D is a flowchart illustrating the procedure of the siphertext decryption processing of the communication apparatus 210/220 according to this example embodiment. This flowchart is executed by the CPU 211/221 of FIG. 4A using the RAM 340, thereby implementing the functional components shown in FIGS. 3A to 3C.

In step S431, the communication apparatus 210/220 determines whether there is a ciphertext message to be decrypted. If there is a ciphertext message to be decrypted, the communication apparatus 210/220 reads out the stored public information (public portion) of a transmission source in step S433. In step S435, the communication apparatus 210/220 transmits, to the TPM, a decryption command Decrypt attached with the ciphertext and the public information.

In step S437, the communication apparatus 210/220 waits for return of a plaintext from the TPM. If a plaintext is returned from the TPM, the communication apparatus 210/220 outputs the plaintext in step S439.

<<Security Chip>>

The arrangement and operation of the security chip (TPM) 212/222 according to this example embodiment will be described with reference to FIGS. 5A to 5D.

(Hardware Arrangement)

FIG. 5A is a block diagram showing the hardware arrangement of the security chip (TPM) 212/222 according to this example embodiment. Note that FIG. 5A shows an example of the arrangement of the security chip (TPM) 212/222 according to this example embodiment, and the present invention is not limited to this. That is, further various functions can be added.

The security chip (TPM) 212/222 includes a CPU for TPM 510, a nonvolatile memory 520, an input/output interface (I/O) 530, a RAM 540, and a program 550.

The TPM CPU 510 controls the overall TPM to implement the respective functions. The nonvolatile memory 520 is a memory that maintains stored contents without a power supply, and ensures a storage area for a KPS private portion 521. Note that the storage area for the KPS private portion 521 may be fixed or changed as long as the KPS private portion 521 can be read out at the time of encryption or decryption. The input/output interface (I/O) 530 is an interface for connecting the TPM and the CPU 211/221 of the apparatus. The RAM 540 is a storage unit used by the TPM CPU 510 for temporary storage. The program 550 holds programs corresponding to functions implemented by the TPM. In this example embodiment, the program 550 holds a KPS calculation module 551, a private portion embedding module 552, and encryption module and decryption module 553.

The KPS calculation module 551 is a module that receives an encryption command or decryption command and generates a common key by the private portion using the public portion of the communication partner. The private portion embedding module 552 is a module that holds the KPS private portion in the nonvolatile memory in accordance with an instruction from the CPU of the apparatus. The encryption module and decryption module 553 are modules that respectively convert a plaintext into a ciphertext and a ciphertext into a plaintext using the common key generated by the KPS calculation module 551.

Note that components other than those denoted by the reference numerals and described above are blocks indicating functions generally provided in the TPM, and a description thereof will be omitted.

(Private Portion Embedding Processing Procedure)

Figure 5B:
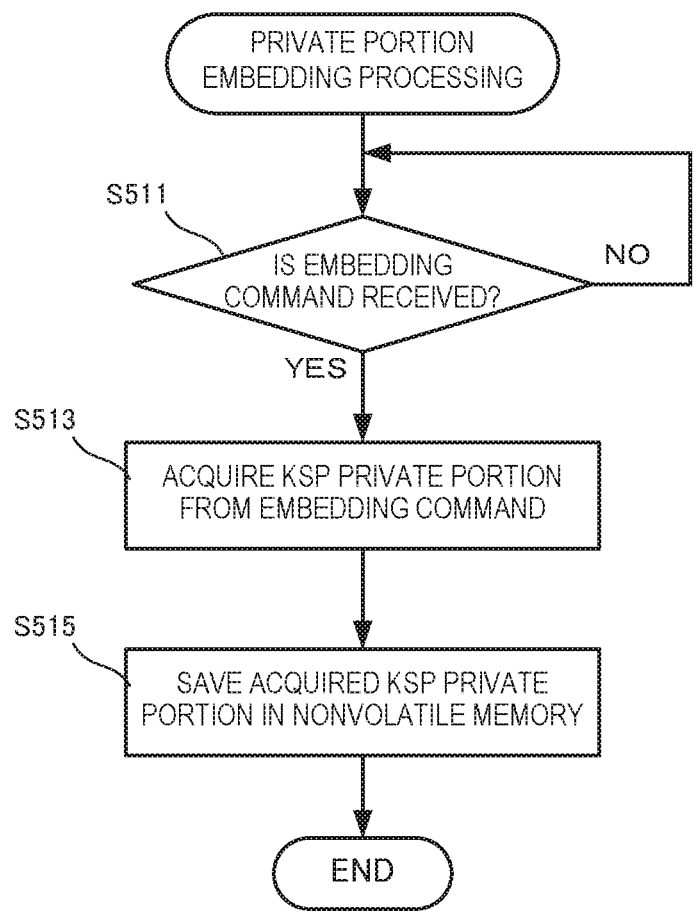
FIG. 5B is a flowchart illustrating the procedure of the private portion embedding processing of the security chip (TPM) according to the second example embodiment of the present invention.

FIG. 5B is a flowchart illustrating the procedure of the private portion embedding processing of the security chip (TPM) 212/222 according to this example embodiment. This flowchart is executed by the TPM CPU 510 of FIG. 5A using the RAM 540, thereby implementing the functional components shown in FIG. 5A. Note that the following processing procedure of the security chip (TPM) 212/222 will be explained on the assumption that the security chip (TPM) 212/222 is used in the communication apparatus having both the encryption processing function and the decryption processing function. In fact, however, there are also security chips (TPMs) dedicated for an encryption side apparatus and decryption side apparatus, and the present invention includes these security chips.

In step S511, the security chip (TPM) 212/222 waits for reception of a KPS private portion embedding command. If a KPS private portion embedding command is received, the security chip (TPM) 212/222 acquires, in step S513, the KPS private portion from the embedding command. In step S515, the security chip (TPM) 212/222 saves the acquired KPS private portion in the nonvolatile memory.

(Encryption Processing Procedure)

Figure 5C:
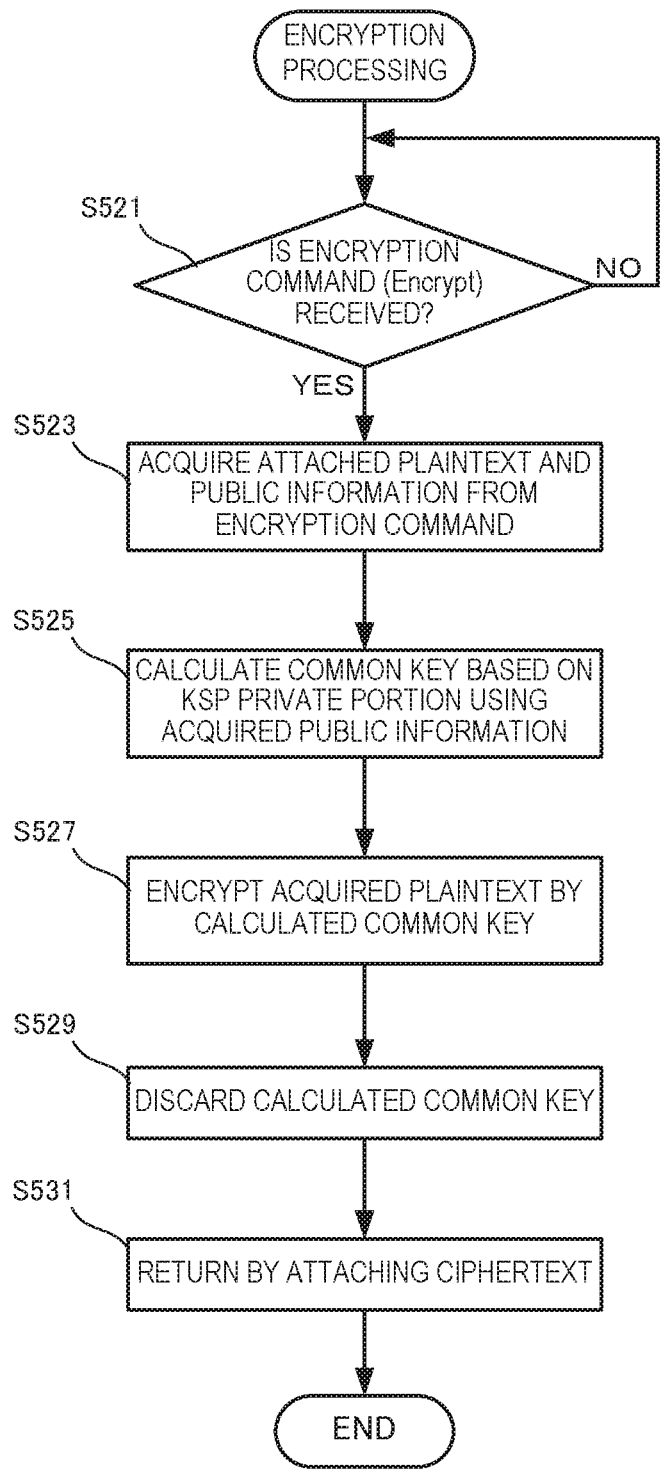
FIG. 5C is a flowchart illustrating the procedure of the encryption processing of the security chip (TPM) according to the second example embodiment of the present invention.

FIG. 5C is a flowchart illustrating the procedure of the encryption processing of the security chip (TPM) 212/222 according to this example embodiment. This flowchart is executed by the TPM CPU 510 of FIG. 5A using the RAM 540, thereby implementing the functional components shown in FIG. 5A.

In step S521, the security chip (TPM) 212/222 waits for reception of an encryption command Encrypt. If an encryption command Encrypt is received, the security chip (TPM) 212/222 acquires, in step S523, an attached plaintext and public information (public portion) from the encryption command. In step S525, the security chip (TPM) 212/222 calculates a common key based on the KPS private portion in the TPM using the acquired public information.

In step S527, the security chip (TPM) 212/222 encrypts the acquired plaintext by the calculated common key. In step S529, the security chip (TPM) 212/222 discards the calculated common key. In step S531, the security chip (TPM) 212/222 returns an encryption command from the CPU of the apparatus by attaching a ciphertext and a status.

(Decryption Processing Procedure)

FIG. 5D is a flowchart illustrating the procedure of the decryption processing of the security chip (TPM) 212/222 according to this example embodiment. This flowchart is executed by the TPM CPU 510 of FIG. 5A using the RAM 540, thereby implementing the functional components shown in FIG. 5A.

In step S541, the security chip (TPM) 212/222 waits for reception of a decryption command Decrypt. If a decryption command Decrypt is received, the security chip (TPM) 212/222 acquires, in step S543, an attached ciphertext and public information (public portion) from the decryption command. In step S545, the security chip (TPM) 212/222 calculates a common key based on the KPS private portion in the TPM using the acquired public information.

In step S547, the security chip (TPM) 212/222 decrypts the acquired ciphertext by the calculated common key. In step S549, the security chip (TPM) 212/222 discards the calculated common key. In step S551, the security chip (TPM) 212/222 returns a decryption command from the CPU of the apparatus by attaching a plaintext and a status.

According to the present invention, it is possible to prevent leakage of a common key and improve the confidentiality of communication information by generating a common key in the TPM at the time of encryption or decryption, performing encryption or decryption in the TPM, and discarding the common key after the end of encryption or decryption.

Third Example Embodiment

An encryption communication system according to the third example embodiment of the present invention will be described next. The encryption communication system according to this example embodiment is different from the second example embodiment in that a KPS private algorithm portion for an initialization vector (IV) is concealed in a TPM and a public portion is freely made public in order to share an initialization vector to be used in a CBC mode (Cipher Block Chaining Mode) or CFB mode (Cipher Feedback Mode) of the common key cryptosystem. The remaining components and operations are the same as those in the second example embodiment. Hence, the same reference numerals denote the same components and operations, and a detailed description thereof will be omitted.

<<Encryption Communication System>>

The arrangement and operation of an encryption communication system 700 according to this example embodiment will be described with reference to FIGS. 7A to 7C.

(Operation Preparation Procedure Sequence)

Figure 7A:
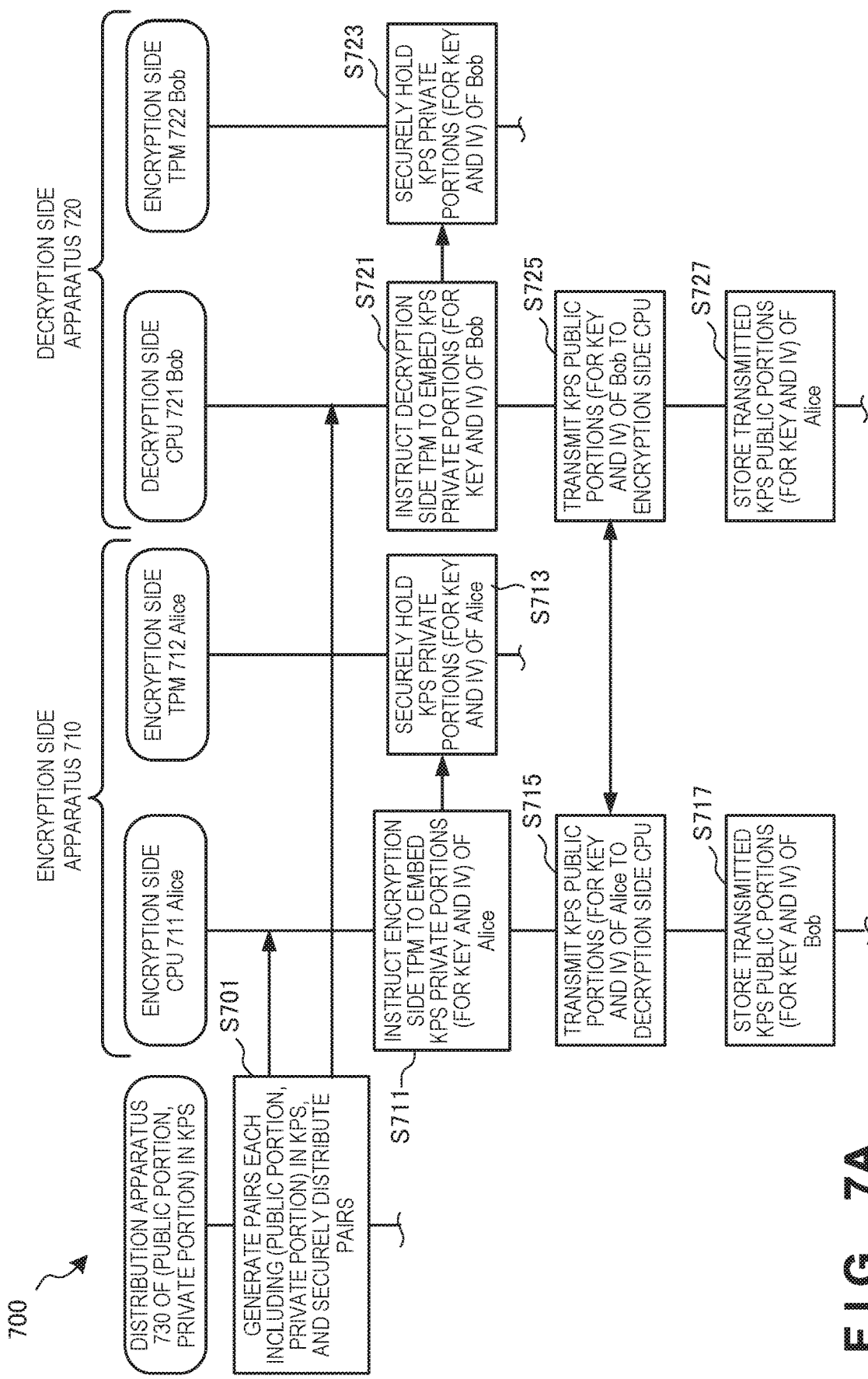
FIG. 7A is a sequence chart showing the operation procedure of the operation preparation processing of an encryption communication system according to the third example embodiment of the present invention.

FIG. 7A is a sequence chart showing the operation procedure of the operation preparation processing of the encryption communication system 700 according to this example embodiment. Note that respective steps in FIG. 7A are obtained by extending the KPS public portion and KPS private portion in FIG. 2A to sharing of an initialization vector (IV).

As for an initialization vector (IV) as well, in step S701, a distribution apparatus 730 that further distributes a pair of (public portion, private portion) of IV in KPS, distributes pairs each including (public portion, private portion) in KPS to an encryption side CPU 711 of an encryption side apparatus 710 and a decryption side CPU 721 of a decryption side apparatus 720, respectively. Note that FIG. 7A exemplifies an example of distributing, from the distribution apparatus 730, pairs each including (public portion, private portion) in KPS. However, the encryption side CPU 711 or the decryption side CPU 721 may transmit the public portions, and receive the private portions.

In step S711, the encryption side CPU 711 instructs an encryption side TPM 712 to embed the received KPS private portions (for key and for IV). In step S713, the encryption side TPM 712 securely holds the KPS private portions at predetermined positions in a nonvolatile memory.

In step S715, the encryption side CPU 711 transmits the received KPS public portions (for key and for IV) to the decryption side CPU 721, and receives decryption side KPS public portions (for key and for IV) transmitted from the decryption side CPU 721. In step S717, the encryption side CPU 711 stores the received decryption side KPS public portions (for key and for IV).

On the other hand, in step S721, the decryption side CPU 721 instructs a decryption side TPM 722 to embed the received KPS private portions (for key and for IV). In step S723, the decryption side TPM 722 securely holds the KPS private portions (for key and for IV) at predetermined positions in a nonvolatile memory.

In step S725, the decryption side CPU 721 transmits the received KPS public portions (for key and for IV) to the encryption side CPU 711, and receives the encryption side KPS public portions (for key and for IV) transmitted from the encryption side CPU 711. In step S727, the decryption side CPU 721 stores the received encryption side KPS public portions (for key and for IV).

(Encryption Processing Sequence)

Figure 7B:
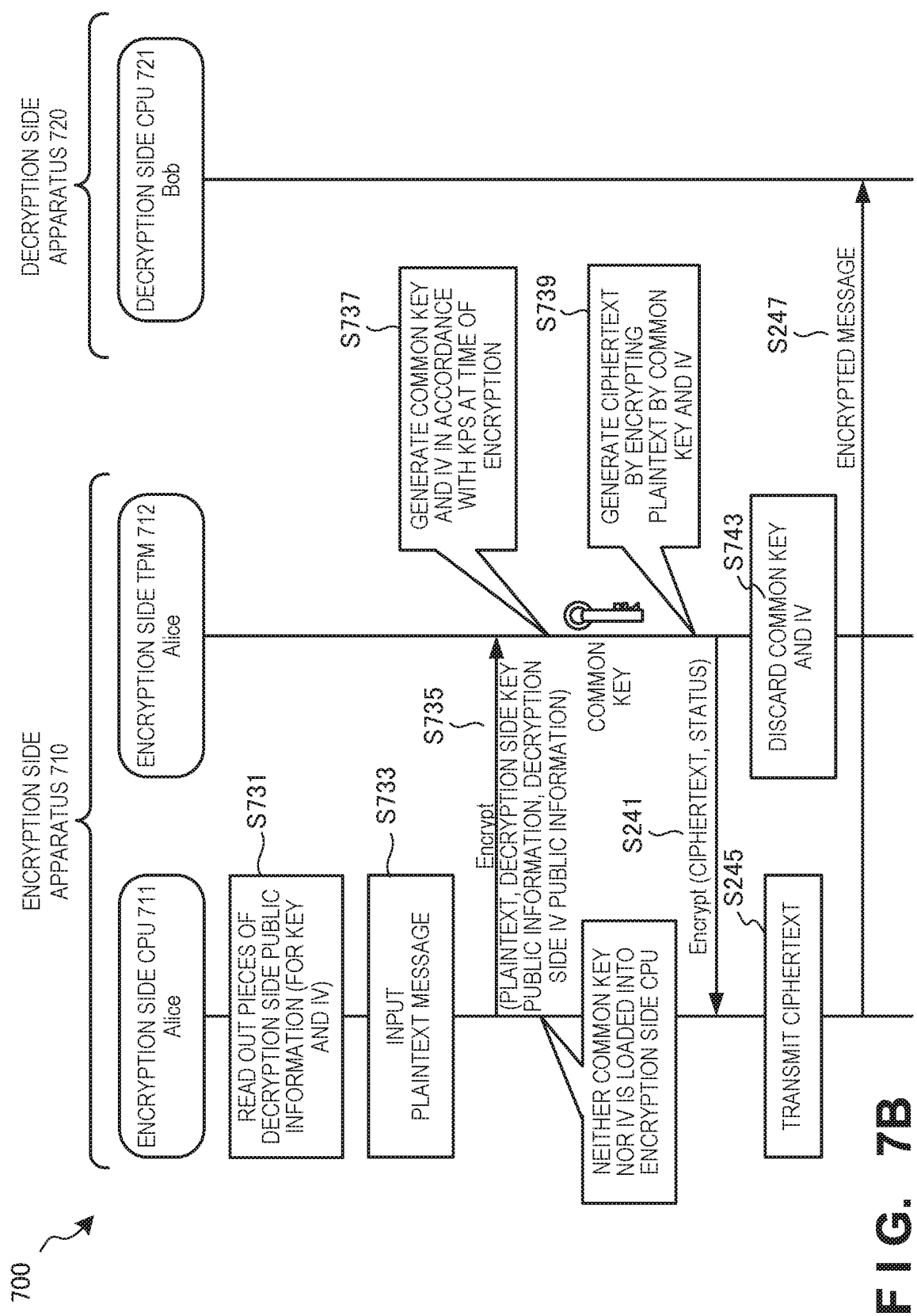
FIG. 7B is a sequence chart showing the operation procedure of the encryption processing of the encryption communication system according to the third example embodiment of the present invention.

FIG. 7B is a sequence chart showing the operation procedure of the encryption processing of the encryption communication system 700 according to this example embodiment. Note that respective steps in FIG. 7B are obtained by extending the KPS public portion and KPS private portion in FIG. 2B to sharing of an initialization vector (IV). In FIG. 7B, the same step numbers as those in FIG. 2B denote the same steps.

As for an initialization vector (IV) as well, in step S731, the encryption side CPU 711 reads out stored public information (public portions for key and for IV) of a decryption side. In step S733, the encryption side CPU 711 acquires a plaintext message, and inputs it to the encryption side TPM 712. That is, in step S735, the encryption side CPU 711 transmits, to the encryption side TPM 712, an encryption command attached with the plaintext and the pieces of public information of a decryption side, Encrypt (plaintext, public information for key of decryption side, public information for IV of decryption side).

The encryption side TPM 712 analyzes the received encryption command Encrypt (plaintext, public information for key of decryption side, public information for IV of decryption side), and determines to "generate a common key and an IV by the private portions held in the encryption side TPM 712 using the attached public information for key and for IV of a decryption side, repeatedly encrypt the attached plaintext for each block by the common key and the IV, and return a ciphertext to the encryption side CPU 711". The encryption side TPM 712 generates, in step S737, a common key and an IV in accordance with the key predistribution system (KPS), and generates, in step S739, a ciphertext by encrypting the plaintext by the common key and the IV.

In step S241, the encryption side TPM 712 returns, to the encryption side CPU 711, an encryption response command Encrypt (ciphertext, status) attached with the ciphertext encrypted by the common key and the status of the processing in the encryption side TPM 712. In step S743, the encryption side TPM 712 discards the common key generated for encryption.

In step S245, the encryption side CPU 711 transmits, to the decryption side CPU 721 of the decryption side apparatus 720, the ciphertext returned from the encryption side TPM 712. In step S247, the ciphertext is transmitted as an encrypted message to the decryption side CPU 721.

(Decryption Processing Sequence)

Figure 7C:
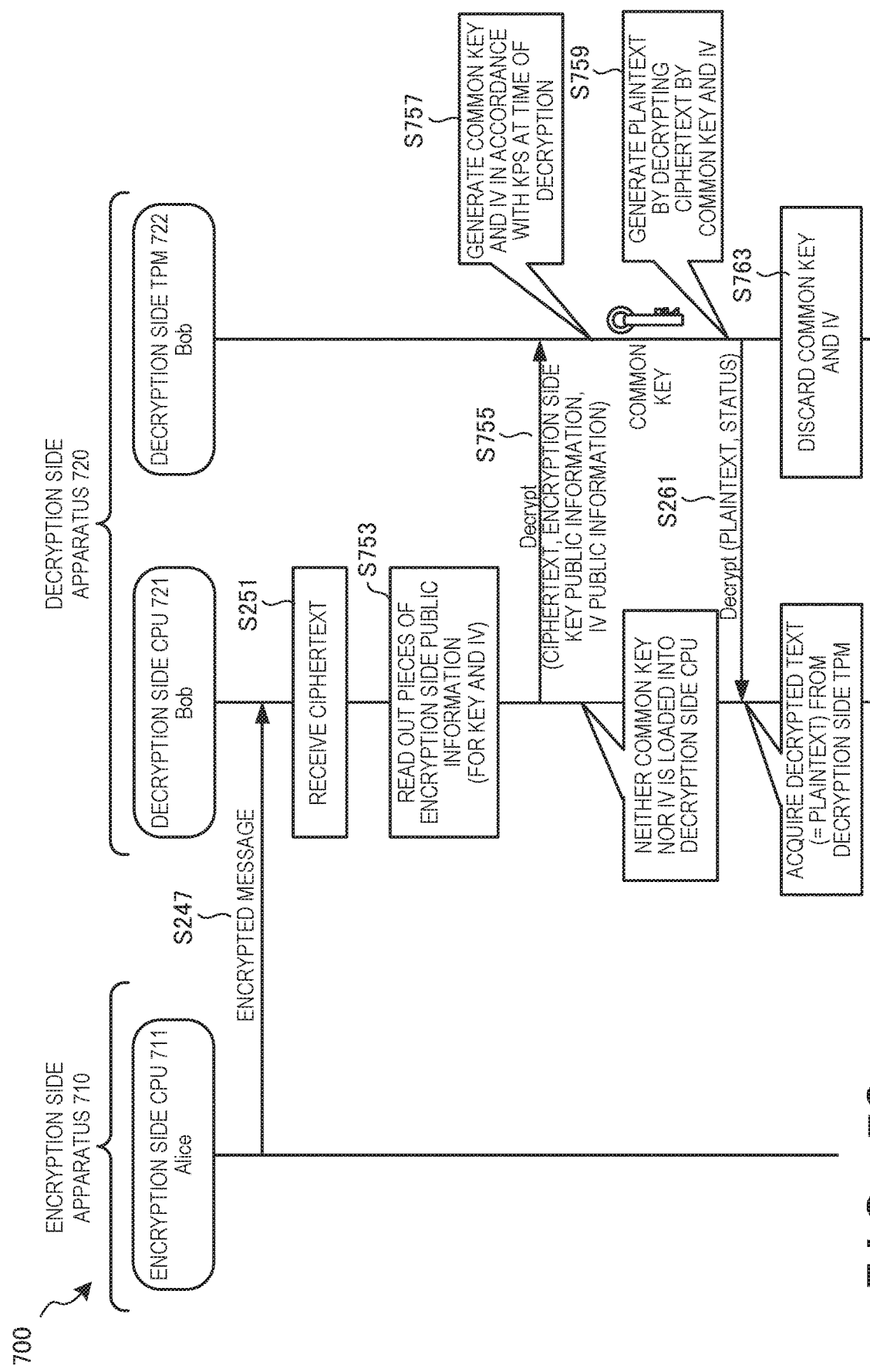
FIG. 7C is a sequence chart showing the operation procedure of the decryption processing of the encryption communication system according to the third example embodiment of the present invention.

FIG. 7C is a sequence chart showing the operation procedure of the decryption processing of the encryption communication system 700 according to this example embodiment. Note that respective steps in FIG. 7C are obtained by extending the KPS public portion and KPS private portion in FIG. 2C to sharing of an initialization vector (IV). In FIG. 7C, the same step numbers as those in FIG. 2C denote the same steps.

In step S251, the decryption side CPU 721 receives the ciphertext from the encrypted message transmitted from the encryption side CPU 711 in step S247. In step S753, the decryption side CPU 721 reads out the stored pieces of public information (public portions for key and for IV) of an encryption side. In step S755, the decryption side CPU 721 transmits, to the decryption side TPM 722, a decryption command attached with the ciphertext and the pieces of public information of an encryption side, Decrypt (ciphertext, public information for key of encryption side, public information for IV of encryption side).

The decryption side TPM 722 analyzes the received decryption command Decrypt (ciphertext, public information for key of encryption side, public information for IV of encryption side), and determines to "generate a common key and an IV by the private portions held in the decryption side TPM 722 using the attached public information for key and for IV of encryption side, decrypt the attached ciphertext by the common key and the IV, and return a plaintext to the decryption side CPU 721". The decryption side TPM 722 generates, in step S757, a common key and an IV in accordance with the key predistribution system (KPS), and generates, in step S759, a plaintext by decrypting the ciphertext by the common key and the IV.

In step S261, the decryption side TPM 722 returns, to the decryption side CPU 721, a decryption response command Decrypt (plaintext, status) attached with the plaintext decrypted by the common key and the status of the processing in the decryption side TPM 722. In step S763, the decryption side TPM 722 discards the common key generated for decryption.

<<Communication Apparatus>>

The arrangement and operation of the communication apparatus 710/720 according to this example embodiment will be described with reference to FIGS. 8A and 8B.

(Hardware Arrangement)

Figure 8A:
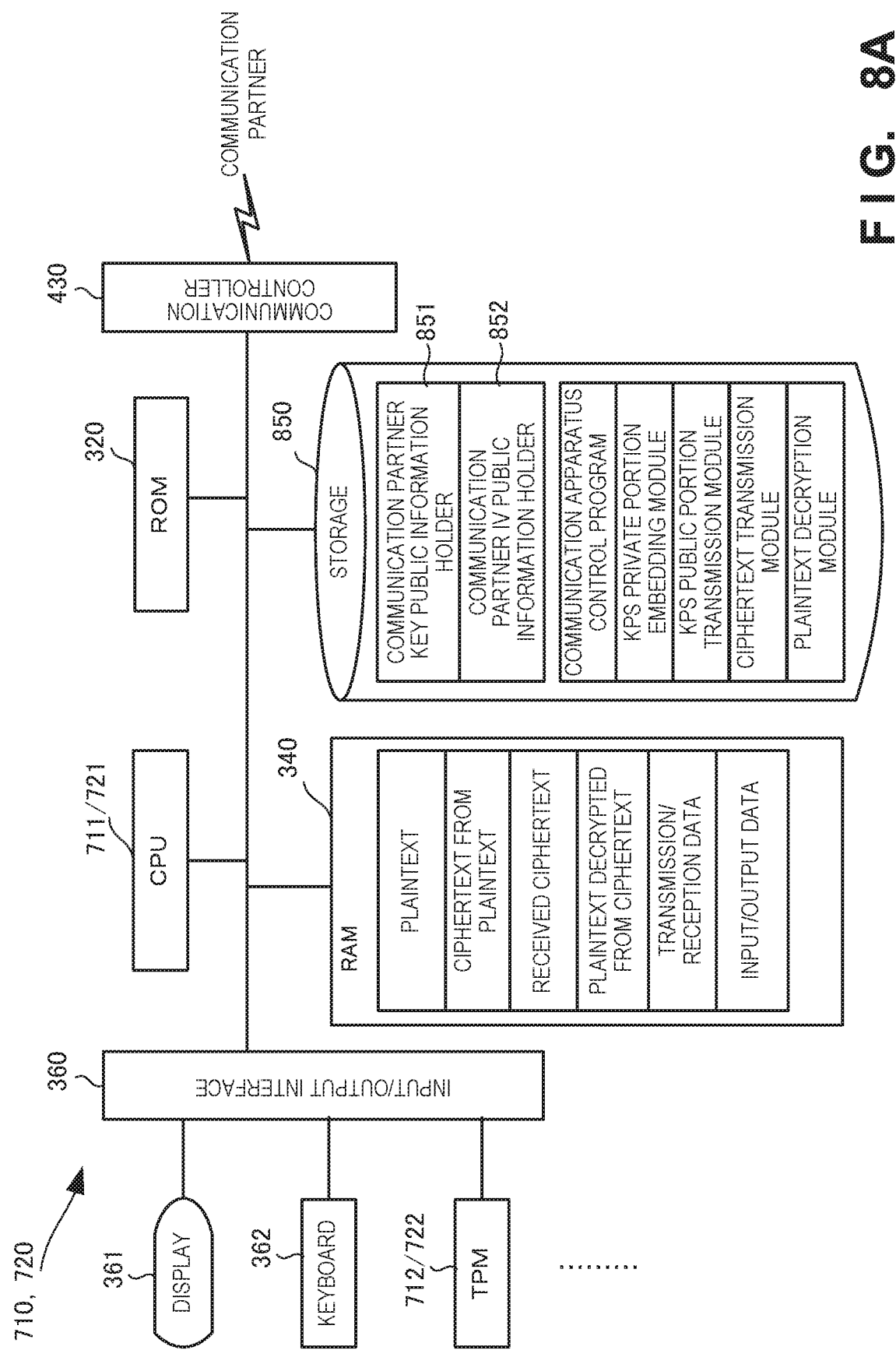
FIG. 8A is a block diagram showing the hardware arrangement of a communication apparatus according to the third example embodiment of the present invention.

FIG. 8A is a block diagram showing the hardware arrangement of the communication apparatus 710/720 according to this example embodiment. Note that in FIG. 8A, the same reference numerals as those in FIG. 4A denote the same components and a description thereof will be omitted.

In FIG. 8A, the CPU 711/721 is an arithmetic control processor, and implements the functional components shown in FIGS. 7A to 7C by executing a program.

A storage 850 stores a database, various parameters, or the following data or programs necessary for implementation of the example embodiment. A public information holder for key of a communication partner 851 holds a KPS public portion for generating a common key that is transmitted from the communication apparatus as the communication partner and used to generate a common key at the time of encryption or decryption. A public information holder for IV of a communication partner 852 holds a KPS public portion for generating an IV that is transmitted from the communication apparatus as the communication partner and used to generate an IV at the time of encryption or decryption.

The TPM 712/722 is connected to an input/output interface 360. Note that the TPM 712/722 may be connected by another interface.

Note that programs and data that are associated with the general-purpose functions of the communication apparatus 710/720 and other feasible functions are not shown in a RAM 340 or the storage 850 of FIG. 8A.

(Operation Preparation Processing Procedure)

Figure 8B:
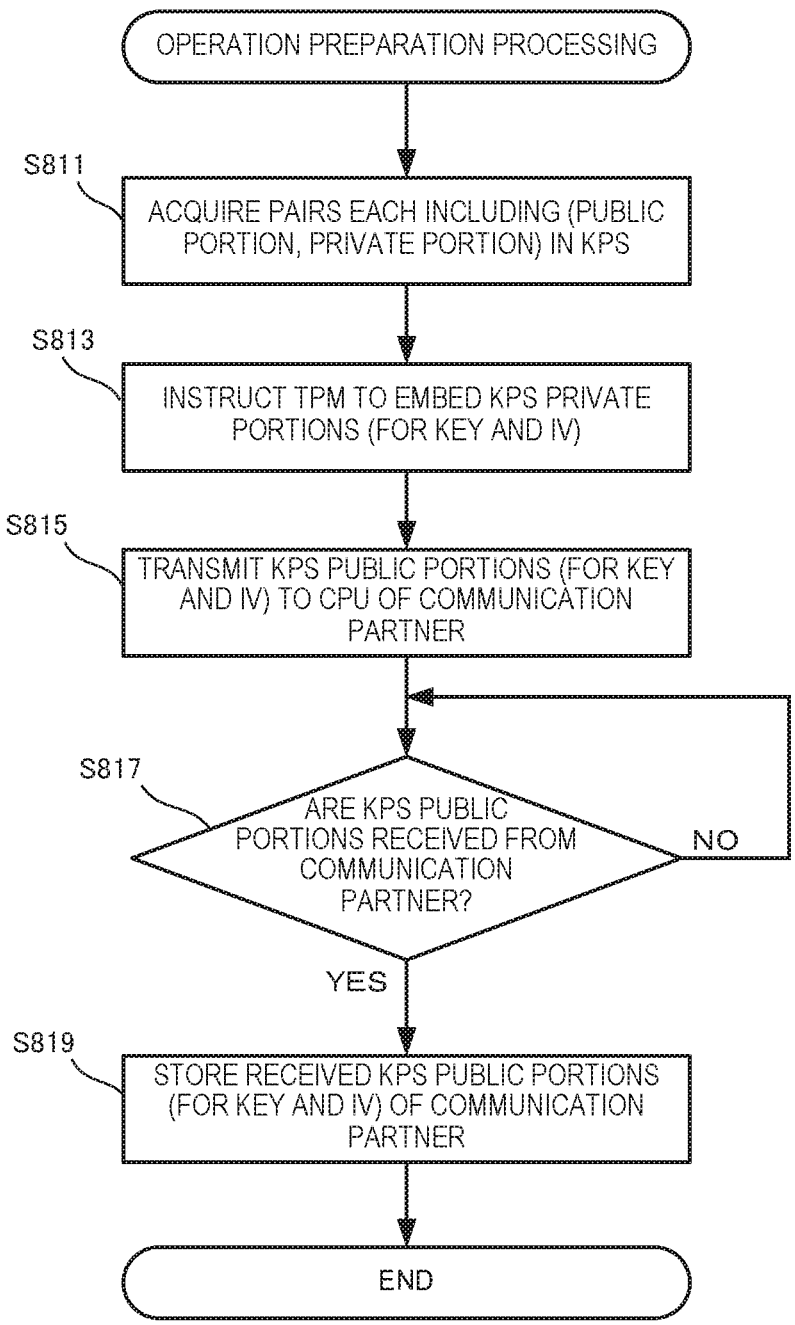
FIG. 8B is a flowchart illustrating the procedure of the operation preparation processing of the communication apparatus according to the third example embodiment of the present invention.

FIG. 8B is a flowchart illustrating the procedure of the operation preparation processing of the communication apparatus 710/720 according to this example embodiment. This flowchart is executed by the CPU 711/721 of FIG. 8A using the RAM 340, thereby implementing the functional components shown in FIGS. 7A to 7C. Note that the following processing procedure of the communication apparatus 710/720 will be explained on the assumption that the communication apparatus 710/720 has both an encryption processing function and a decryption processing function. In fact, however, there are also apparatuses dedicated for an encryption side apparatus and decryption side apparatus, and the present invention includes these apparatuses. Respective steps in FIG. 8B are obtained by extending the KPS public portion and KPS private portion in FIG. 4B to sharing of an initialization vector (IV).

In step S811, the communication apparatus 710/720 acquires pairs each including (public portion, private portion) in KPS including an initialization vector. Note that as described above, a private portion may be acquired based on a public portion. In step S813, the communication apparatus 710/720 instructs the TPM to embed the KPS private portions (for key and for IV). In step S815, the communication apparatus 710/720 transmits the KPS public portions (for key and for IV) to the CPU of the communication partner.

In step S817, the communication apparatus 710/720 waits for reception of the KPS public portions (for key and for IV) from the communication partner. If the KPS public portions (for key and for IV) are received, the communication apparatus 710/720 stores the received KPS public portions (for key and for IV) of the communication partner in step S819.

<<Security Chip>>

The arrangement and operation of the security chip (TPM) 712/722 according to this example embodiment will be described with reference to FIGS. 9A and 9B.

(Hardware Arrangement)

Figure 9A:
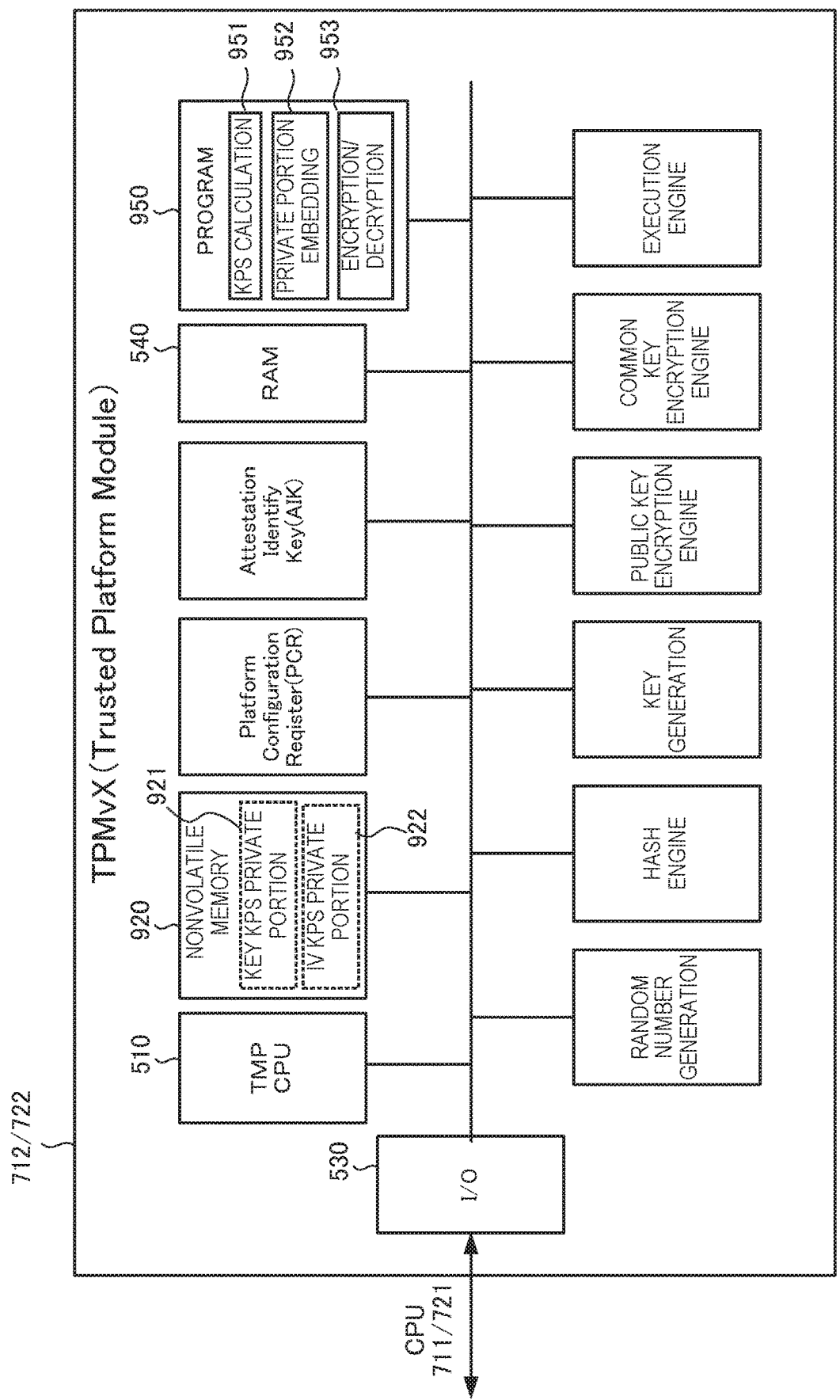
FIG. 9A is a block diagram showing the hardware arrangement of a security chip (TPM) according to the third example embodiment of the present invention.

FIG. 9A is a block diagram showing the hardware arrangement of the security chip (TPM) 712/722 according to this example embodiment. Note that in FIG. 9A, the same reference numerals as those in FIG. 5A denote the same functional components and a repetitive description thereof will be omitted.

A nonvolatile memory 920 holds a KPS private portion for key 921 and a KPS private portion for IV 922. A program 950 holds program corresponding to functions implemented by the TPM. In this example embodiment, the program 950 holds a KPS calculation module 951, a private portion embedding module 952, and encryption module and decryption module 953.

The KPS calculation module 951 is a module that receives an encryption command or decryption command and generates a common key and IV by the private portions using the public portions of the communication partner. The private portion embedding module 952 is a module that holds, in the nonvolatile memory, in accordance with an instruction from the CPU of the apparatus, the KPS private portions for generating a common key and IV. The encryption module and decryption module 953 are modules that respectively convert a plaintext into a ciphertext and a ciphertext into a plaintext using the common key and IV generated by the KPS calculation module 951.

(Private Portion Embedding Processing Procedure)

Figure 9B:
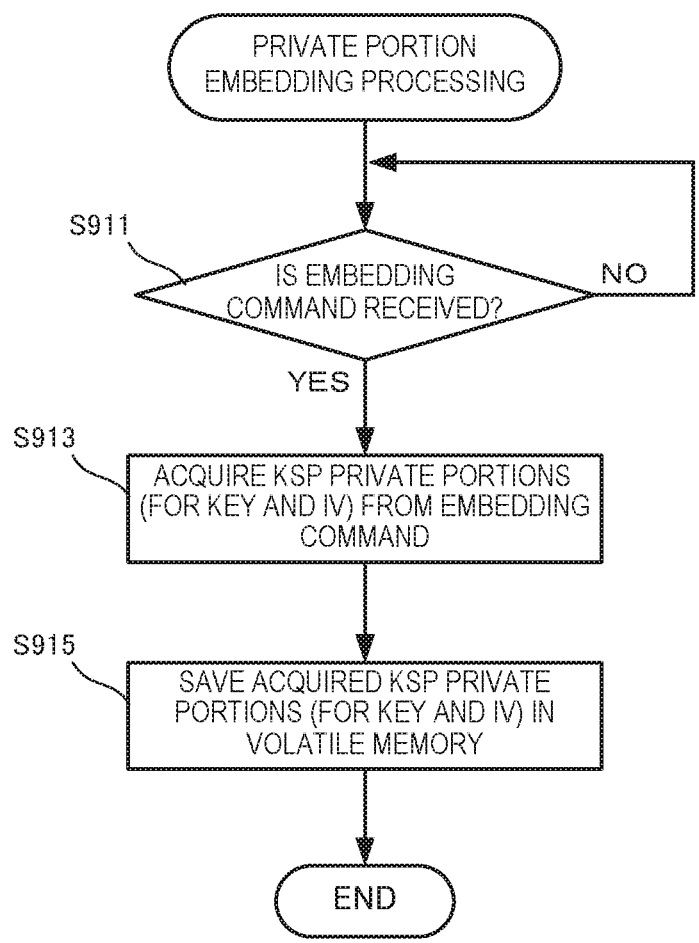
FIG. 9B is a flowchart illustrating the procedure of the private portion embedding processing of the security chip (TPM) according to the third example embodiment of the present invention.

FIG. 9B is a flowchart illustrating the procedure of the private portion embedding processing of the security chip (TPM) 712/722 according to this example embodiment. This flowchart is executed by the TPM CPU 510 of FIG. 9A using the RAM 540, thereby implementing the functional components shown in FIG. 9A. Note that the following processing procedure of the security chip (TPM) 712/722 will be explained on the assumption that the security chip (TPM) 712/722 is used in the communication apparatus having both the encryption processing function and the decryption processing function. In fact, however, there are also security chips (TPMs) dedicated for an encryption side apparatus and decryption side apparatus, and the present invention includes these security chips. Respective steps in FIG. 9A are obtained by extending the KPS public portion and KPS private portion in FIG. 5B to sharing of an initialization vector (IV).

In step S911, the security chip (TPM) 712/722 waits for reception of a KPS private portion embedding command including an initialization vector (IV). If a KPS private portion embedding command is received, the security chip (TPM) 712/722 acquires, in step S913, the KPS private portions (for key and for IV) from the embedding command. In step S915, the security chip (TPM) 712/722 saves the acquired common key and a KPS private portion for IV in the nonvolatile memory.

Note that although not described in this example embodiment, an initialization vector used for encryption or decryption of the second block or a subsequent block is updated in the TPM in accordance with the CBC mode or CFB mode.

According to this example embodiment, it is also possible to prevent leakage of an initialization vector (IV) used in the CBC mode or CFB mode of the common key cryptosystem and improve the confidentiality of communication information.

Fourth Example Embodiment

An encryption communication system according to the fourth example embodiment of the present invention will be described next. The encryption communication system according to this example embodiment is different from the second and third example embodiments in that a common key or initialization vector is generated from the private portion of the self communication apparatus and a public portion of a communication partner among three or more communication apparatuses. The remaining components and operations are the same as those in the second or third example embodiment. Hence, the same reference numerals denote the same components and operations, and a detailed description thereof will be omitted.

(Operation Preparation Processing Sequence)

Figure 10:
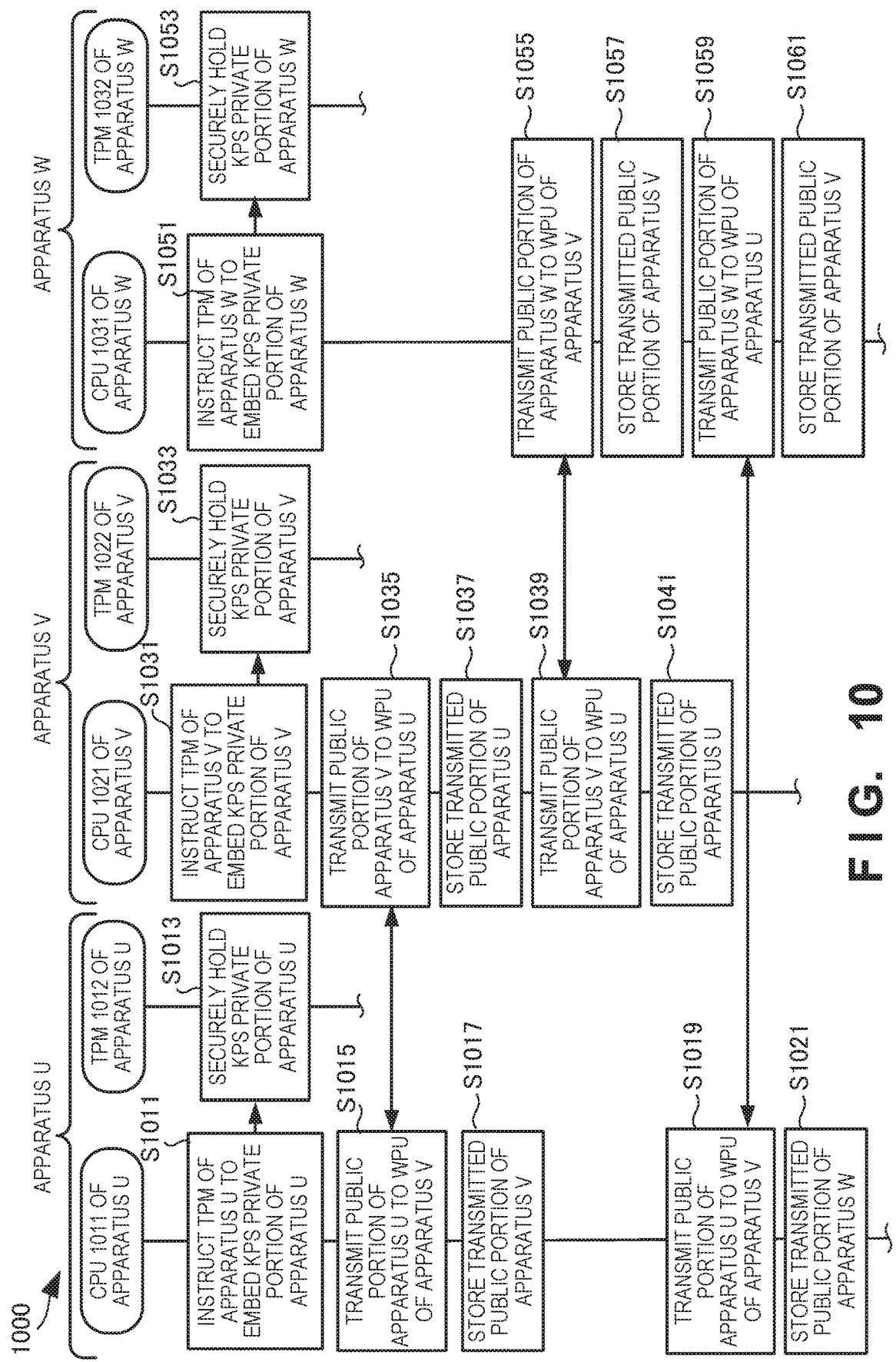
FIG. 10 is a sequence chart showing the operation procedure of the operation preparation processing of an encryption communication system according to the fourth example embodiment of the present invention.

FIG. 10 is a sequence chart showing the operation procedure of the operation preparation processing of the encryption communication system according to this example embodiment. Note that respective steps in FIG. 10 are obtained by extending the KPS public portion and KPS private portion in FIG. 2A to sharing among three or more communication apparatuses. To avoid a repetitive description, FIG. 10 does not illustrate a step of causing a distribution apparatus 230 to distribute a pair of (public portion, private portion) in KPS to the CPU of each communication apparatus.

In step S1011, a CPU 1011 of an apparatus U instructs a TPM 1012 of the apparatus U to embed a received KPS private portion. In step S1013, the TPM 1012 of the apparatus U securely holds the KPS private portion at a predetermined position in a nonvolatile memory.

In step S1015, the CPU 1011 of the apparatus U transmits a received KPS public portion to a CPU 1021 of an apparatus V, and receives a KPS public portion of the apparatus V transmitted from the CPU 1021 of the apparatus V. Then, in step S1017, the CPU 1011 of the apparatus U stores the received KPS public portion of the apparatus V.

On the other hand, in step S1031, the CPU 1021 of the apparatus V instructs a TPM 1022 of the apparatus V to embed the received KPS private portion. In step S1033, the TPM 1022 of the apparatus V securely holds the KPS private portion at a predetermined position in a nonvolatile memory.

In step S1035, the CPU 1021 of the apparatus V transmits the received KPS public portion to the CPU 1011 of the apparatus U, and receives the KPS public portion of the apparatus U transmitted from the CPU 1011 of the apparatus U. Then, in step S1037, the CPU 1021 of the apparatus V stores the received KPS public portion of the apparatus U.

In step S1039, the CPU 1021 of the apparatus V transmits the received KPS public portion to a CPU 1031 of an apparatus W, and receives a KPS public portion of the apparatus W transmitted from the CPU 1031 of the apparatus W. Then, in step S1041, the CPU 1021 of the apparatus V stores the received KPS public portion of the apparatus W.

On the other hand, in step S1051, the CPU 1031 of the apparatus W instructs a TPM 1032 of the apparatus W to embed the received KPS private portion. In step S1053, the TPM 1032 of the apparatus W securely holds the KPS private portion at a predetermined position in a nonvolatile memory.

In step S1055, the CPU 1031 of the apparatus W transmits the received KPS public portion to the CPU 1021 of the apparatus V, and receives the KPS public portion of the apparatus V transmitted from the CPU 1021 of the apparatus V. Then, in step S1057, the CPU 1031 of the apparatus W stores the received KPS public portion of the apparatus V.

In step S1019, the CPU 1011 of the apparatus U transmits the received KPS public portion to the CPU 1031 of the apparatus W, and receives the KPS public portion of the apparatus W transmitted from the CPU 1031 of the apparatus W. Then, in step S1021, the CPU 1011 of the apparatus U stores the received KPS public portion of the apparatus W.

On the other hand, in step S1059, the CPU 1031 of the apparatus W transmits the received KPS public portion to the CPU 1011 of the apparatus U, and receives the KPS public portion of the apparatus U transmitted from the CPU 1011 of the apparatus U. Then, in step S1061, the CPU 1031 of the apparatus W stores the received KPS public portion of the apparatus U.

<<Communication Apparatus>>

The arrangement and operation of the communication apparatus U/V/W according to this example embodiment will be described with reference to FIGS. 11A to 11D.

(Public Information Table)

Figure 11A:
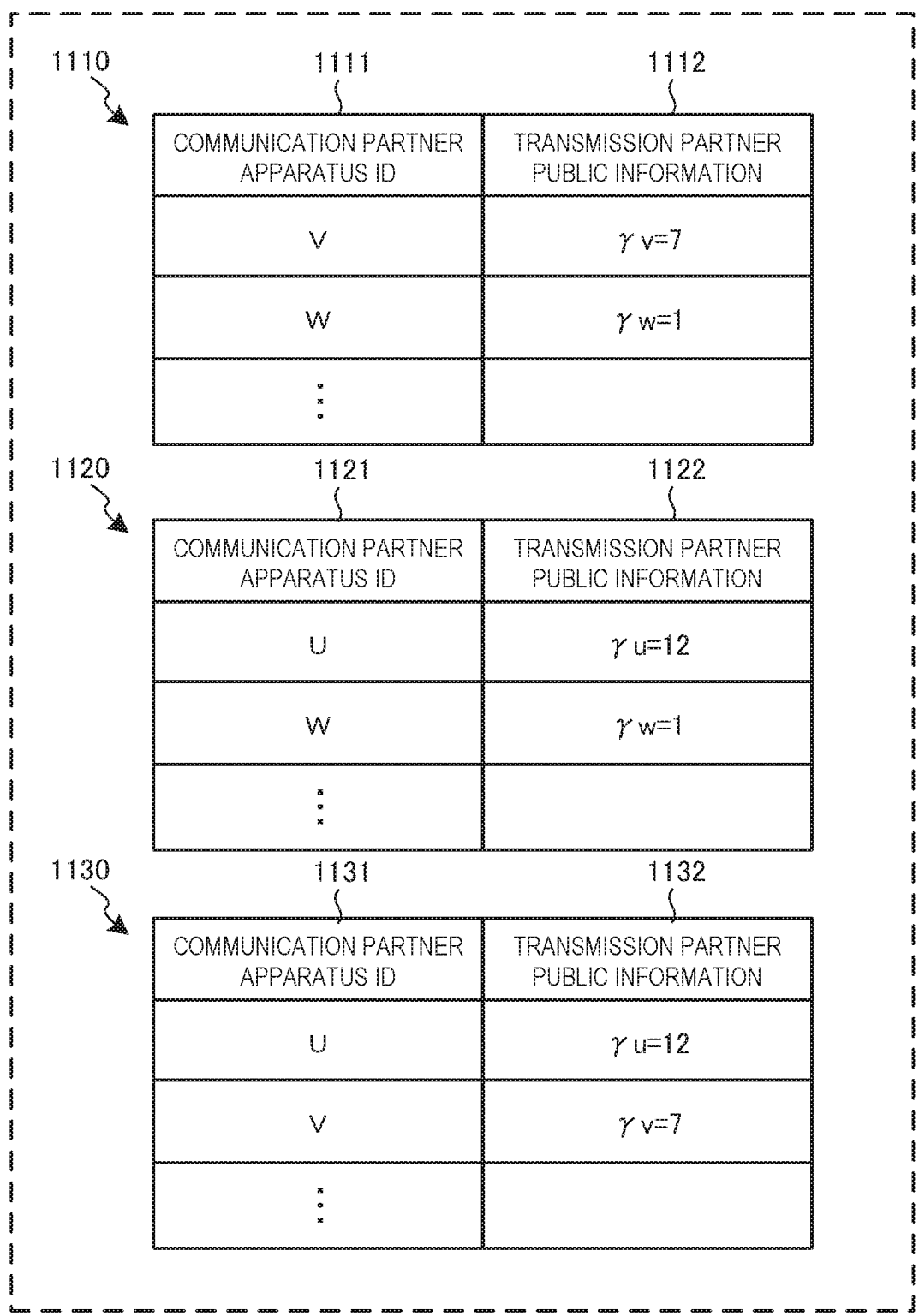
FIG. 11A shows tables each showing the structure of a public information table stored in a communication apparatus according to the fourth example embodiment of the present invention.

FIG. 11A shows tables respectively showing the structures of public information tables 1110, 1120, and 1130 stored in the communication apparatuses U, V, and W according to this example embodiment. The apparatus U holds the public information table 1110. The apparatus V holds the public information table 1120. The apparatus W holds the public information table 1130. Note that practical values shown in FIG. 11A correspond to the practical example of the Blom algorithm shown in FIG. 6D.

The public information table 1110 stores, in association with a communication partner apparatus ID 1111, communication partner public information (public portion) 1112 transmitted from the communication partner. That is, the public information table 1110 stores, in association with the communication partner, the public information (public portion) 1112 transmitted from each of the apparatuses V and W.

If the apparatus U encrypts a plaintext to transmit a ciphertext, or decrypts a received ciphertext to generate a plaintext, γv=7 is used as a public portion when the communication partner is the apparatus V, and γw=1 is used as a public portion when the communication partner is the apparatus W, thereby generating the same common key as that of the communication partner using the same private portion held in the TPM.

The public information table 1120 stores, in association with a communication partner apparatus ID 1121, communication partner public information (public portion) 1122 transmitted from the communication partner. That is, the public information table 1120 stores, in association with the communication partner, the public information (public portion) 1122 transmitted from each of the apparatuses U and W. The public information table 1130 stores, in association with a communication partner apparatus ID 1131, communication partner public information (public portion) 1132 transmitted from the communication partner. That is, the public information table 1130 stores, in association with the communication partner, the public information (public portion) 1132 transmitted from each of the apparatuses U and V.

Note that the processing of the apparatus V using the public information table 1120 and the processing of the apparatus W using the public information table 1130 are the same as the processing of the apparatus U using the public information table 1110, and a description thereof will be omitted.

(Operation Preparation Processing Procedure)

Figure 11B:
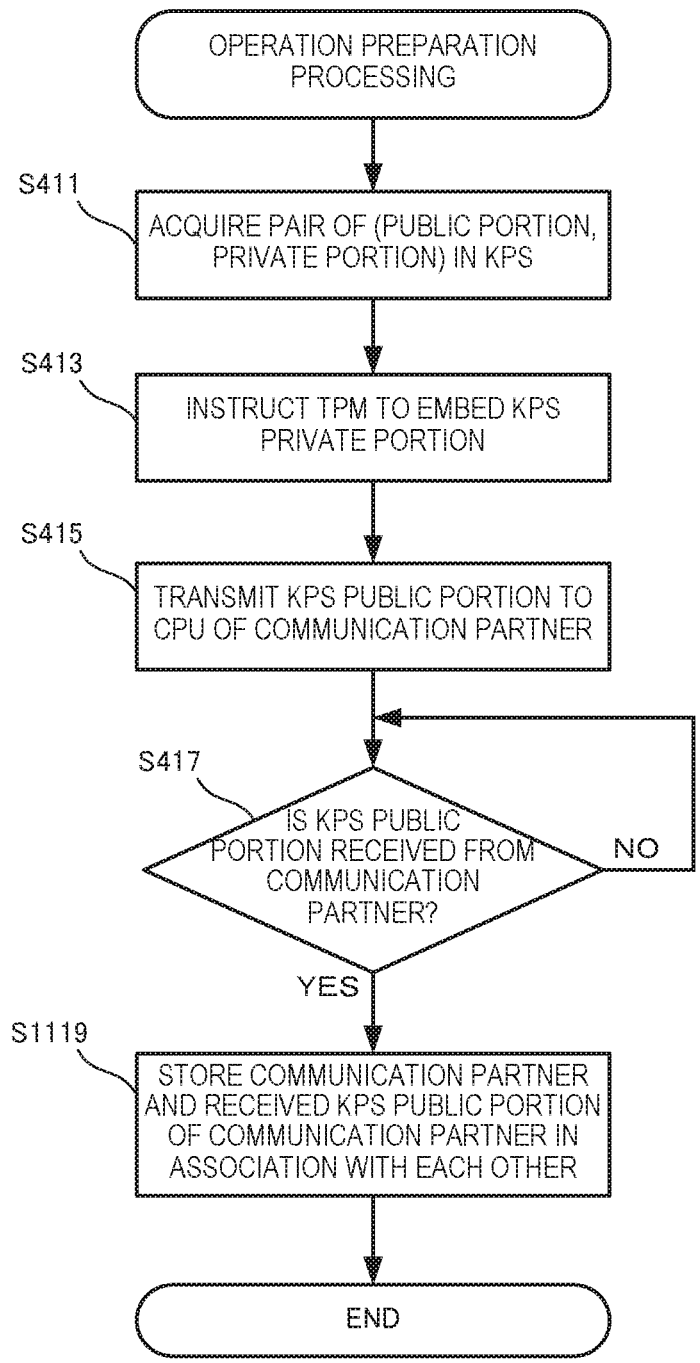
FIG. 11B is a flowchart illustrating the procedure of the operation preparation processing of the communication apparatus according to the fourth example embodiment of the present invention.

FIG. 11B is a flowchart illustrating the procedure of the operation preparation processing of the communication apparatus U/V/W according to this example embodiment. Note that in FIG. 11B, the same step numbers as those in FIG. 4B denote the same steps and a repetitive description thereof will be omitted.

In step S1119, the communication apparatus U/V/W stores the communication partner apparatus ID and the received KPS public portion of the communication partner in association with each other in the public information table.

(Ciphertext Transmission Processing Procedure)

Figure 11C:
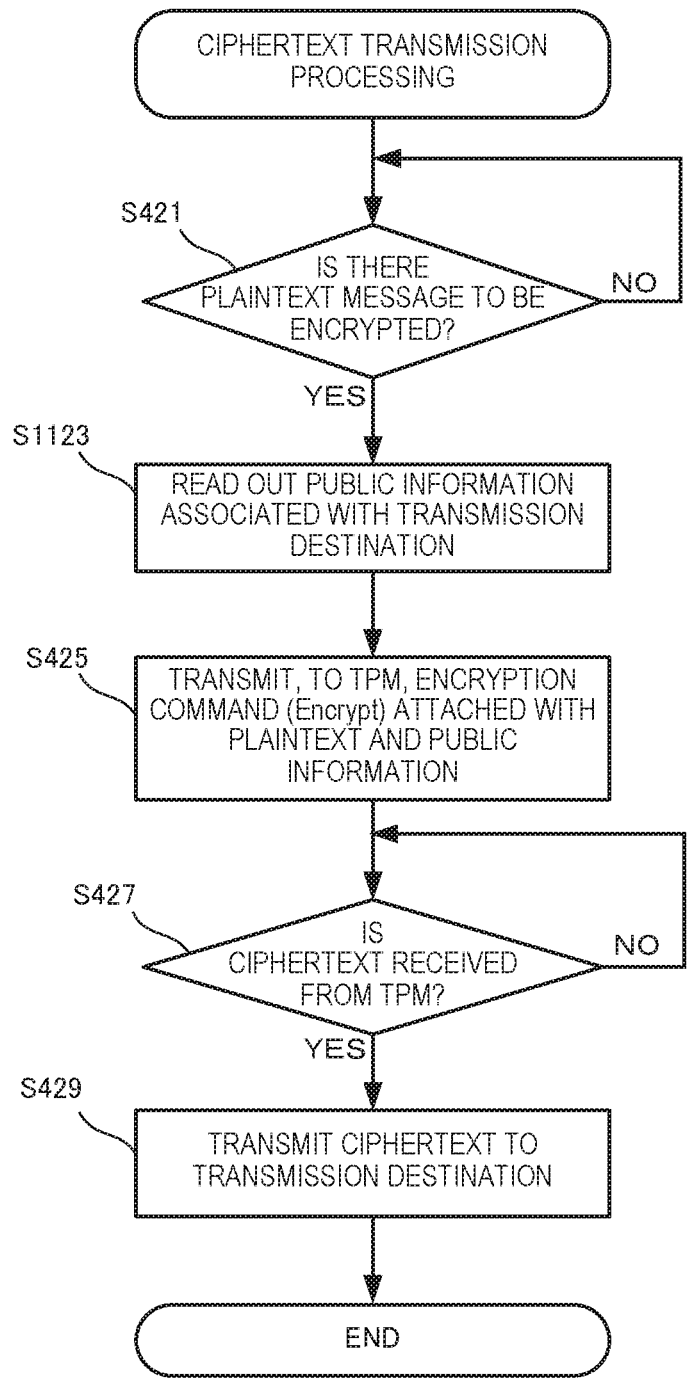
FIG. 11C is a flowchart illustrating the procedure of the ciphertext transmission processing of the communication apparatus according to the fourth example embodiment of the present invention.

FIG. 11C is a flowchart illustrating the procedure of the ciphertext transmission processing of the communication apparatus U/V/W according to this example embodiment. Note that in FIG. 11C, the same step numbers as those in FIG. 4C denote the same steps and a repetitive description thereof will be omitted.

In step S1123, the communication apparatus U/V/W reads out the public information associated with the transmission destination of the ciphertext from the public information table.

(Siphertext Decryption Processing Procedure)

Figure 11D:
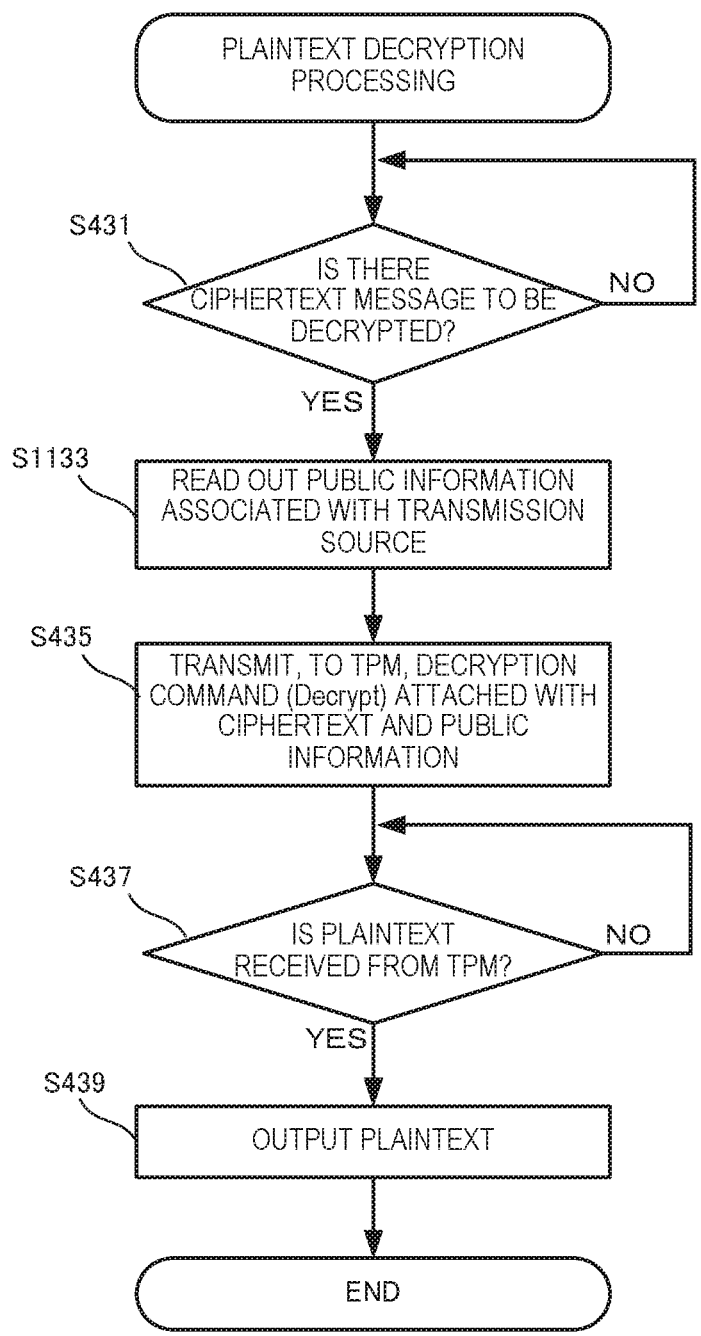
FIG. 11D is a flowchart illustrating the procedure of the plaintext decryption processing of the communication apparatus according the fourth example embodiment of the present invention.

FIG. 11D is a flowchart illustrating the procedure of the siphertext decryption processing of the communication apparatus U/V/W according to this example embodiment. Note that in FIG. 11D, the same step numbers as those in FIG. 4D denote the same steps and a repetitive description thereof will be omitted.

In step S1133, the communication apparatus U/V/W reads out the public information associated with the transmission source of the ciphertext from the public information table.

According to this example embodiment, when three or more communication apparatuses perform encryption communication by a common key system, it is possible to prevent leakage of a common key and improve the confidentiality of communication information by generating the common key in the TPM at the time of encryption or decryption in each communication apparatus, performing encryption or decryption in the TPM, and discarding the common key after the end of encryption or decryption.

Fifth Example Embodiment

An encryption communication system according to the fifth example embodiment of the present invention will be described next. The encryption communication system according to this example embodiment is different from the second to fourth example embodiments in that a TPM has no storage corresponding to an application. In this example embodiment, a TPM obtains the function of each of the above example embodiments by an application downloaded from a server or a storage medium. The remaining components and operations are the same as those in the second to fourth example embodiments. Hence, the same reference numerals denote the same components and operations, and a detailed description thereof will be omitted.

(Application Download Processing Sequence)

Figure 12:
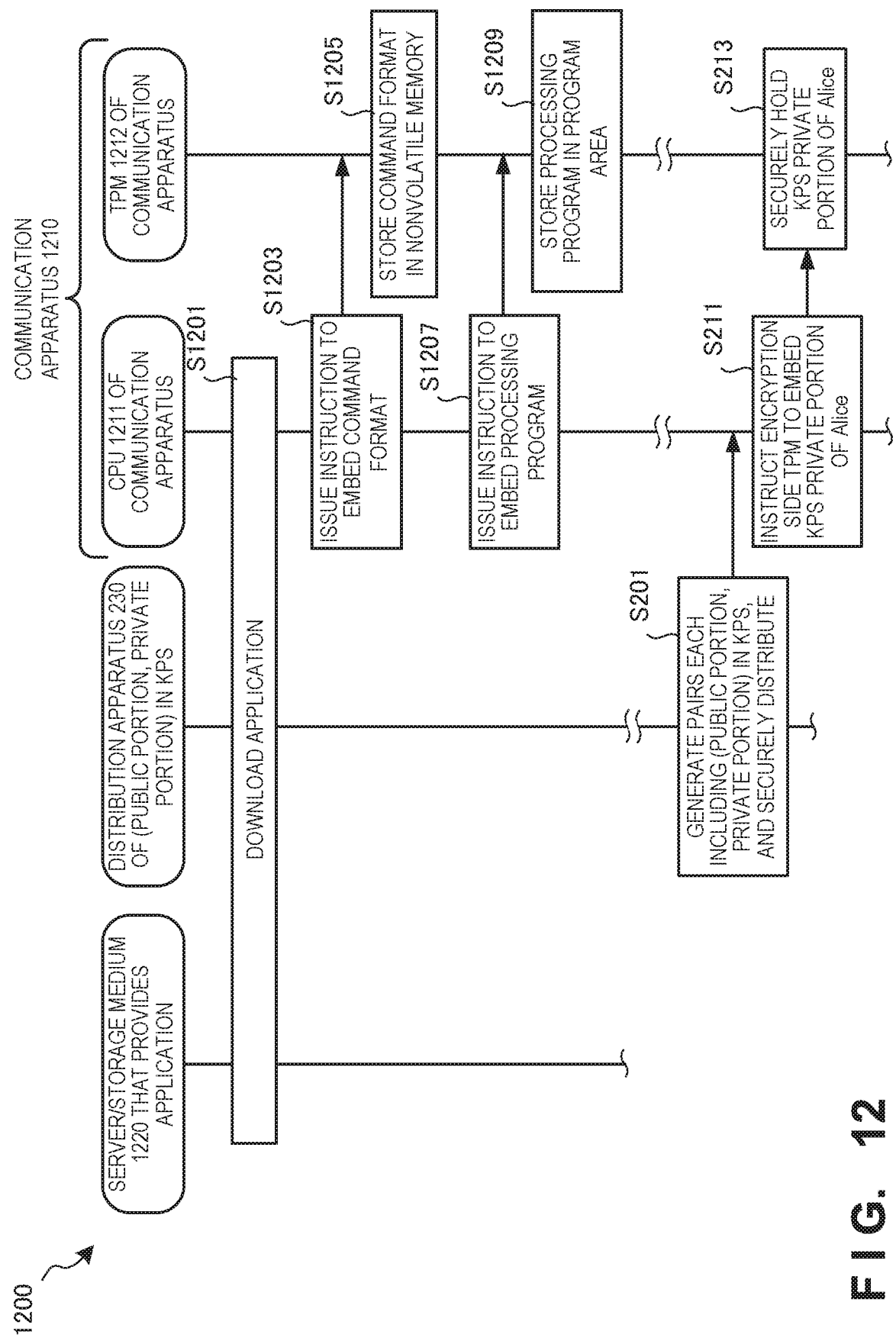
FIG. 12 is a sequence chart showing the operation procedure of the application download processing of an encryption communication system according to the fifth example embodiment of the present invention.

FIG. 12 is a sequence chart showing the operation procedure of the application download processing of an encryption communication system 1200 according to this example embodiment. Referring to FIG. 12, a communication apparatus 1210 has no encryption communication function according to this example embodiment. Especially, this case corresponds to a case in which a TPM 1212 has no encryption communication function according to this example embodiment. Note that in FIG. 12, the same step numbers as those in FIG. 2A denote the same steps and a repetitive description thereof will be omitted.

In step S1201, a CPU 1211 of the communication apparatus 1210 logs in to a server or storage medium 1220 that provides an encryption communication application according to this example embodiment, and downloads the encryption communication application according to this example embodiment.

In step S1203, the CPU 1211 of the communication apparatus 1210 issues an instruction to embed a new command format that is not prepared in the TPM 1212. In step S1205, the TPM 1212 stores the new command format in a nonvolatile memory.

In step S1207, the CPU 1211 of the communication apparatus 1210 issues an instruction to embed a new processing program that is not prepared in the TPM 1212. In step S1209, the TPM 1212 stores the new processing program in a program area.

After that, the TPM 1212 can implement holding of a private portion, generation of a common key, and encryption and decryption according to the processing program in correspondence with an Encrypt command and Decrypt command according to this example embodiment.

According to this example embodiment, even if the communication apparatus or the TPM has no functions necessary for implementation of this example embodiment, these functions can be implemented by downloading them into the communication apparatus or the TPM.

Other Example Embodiments

Note that in the above example embodiments, the arrangement in which the communication apparatus embeds the distributed private portion in the TPM has been explained. Even an arrangement in which a KPS private portion is embedded in advance at the time of manufacturing a TPM, acquiring a corresponding KPS public portion, and transmitting it to a communication partner can produce the same effect as in the present invention.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an encryption communication system that uses a pair of a first private portion and a first public portion and a pair of a second private portion and a second public portion in a key predistribution system (KPS), comprising:

a ciphertext generator that generates a ciphertext by generating, in a first security chip (TPM: Trusted Platform Module) of a first communication apparatus, a first common key by the first private portion held in the first security chip using the second public portion transmitted from a second communication apparatus as a communication partner, and encrypting a plaintext using the first common key in the first security chip; and a decryptor that generates a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip.

(Supplementary Note 2)

There is provided the encryption communication system according to supplementary note 1, wherein said ciphertext generator discards the first common key after encryption using the first common key, and said decryptor discards the second common key after decryption using the second common key.

(Supplementary Note 3)

There is provided the encryption communication system according to supplementary note 1 or 2, further comprising an operation preparation unit that causes the first communication apparatus to hold, out of the pair of the first private portion and the first public portion in the key predistribution system, the first private portion in the first security chip of the first communication apparatus and transmit the first public portion to the communication partner of the first communication apparatus, and the second communication apparatus to hold, out of the pair of the second private portion and the second public portion in the key predistribution system, the second private portion in the second security chip of the second communication apparatus and transmit the second public portion to the communication partner of the second communication apparatus.

(Supplementary Note 4)

There is provided the encryption communication system according to any one of supplementary notes 1 to 3, wherein said ciphertext generator and said decryptor, respectively, generate an initialization vector (IV) when performing encryption and decryption of block units, based on private portion for the initialization vector held in the security chip of the communication apparatus and public portion for the initialization vector transmitted from the communication partner, and use the initialization vector for the encryption and the decryption.

(Supplementary Note 5)

There is provided the encryption communication system according to any one of supplementary notes 1 to 4, further comprising:

a function provider that causes each of the first and second security chips to store a program and data for providing at least one function of a private portion holder that receives and holds the private portion, a common key generator that generates the common key in accordance with the key predistribution system based on the held private portion and the public portion transmitted from the communication partner, a ciphertext generator that generates a ciphertext by receiving an encryption command attached with a plaintext and the public portion transmitted from the communication partner, causing said common key generator to generate the common key, and encrypting the plaintext based on the common key, and a decryptor that generates a plaintext by receiving a decryption command attached with a ciphertext and the public portion transmitted from the communication partner, causing said common key generator to generate the common key, and decrypting the ciphertext based on the common key.

(Supplementary Note 6)

There is provided an encryption communication method that uses a pair of a first private portion and a first public portion and a pair of a second private portion and a second public portion in a key predistribution system (KPS), comprising:

generating a ciphertext by generating, in a first security chip (TPM: Trusted Platform Module) of a first communication apparatus, a first common key by the first private portion held in the first security chip using the second public portion transmitted from a second communication apparatus as a communication partner, and encrypting a plaintext using the first common key in the first security chip; and generating a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip.

(Supplementary Note 7)

There is provided the encryption communication method according to supplementary note 6, wherein in the generating the ciphertext, the first common key is discarded after encryption using the first common key, and in the generating the plaintext, the second common key is discarded after decryption using the second common key.

(Supplementary Note 8)

There is provided a communication apparatus comprising a security chip (TPM: Trusted Platform Module), said security chip comprising:

a private portion holder that holds a private portion in a key predistribution system (KPS);

a common key generator that generates a common key by the held private portion using a public portion in the key predistribution system transmitted from a communication partner; and a ciphertext generator that generates a ciphertext by encrypting a plaintext using the common key.

(Supplementary Note 9)

There is provided the communication apparatus according to supplementary note 8, wherein said ciphertext generator discards the common key after encryption using the common key.

(Supplementary Note 10)

There is provided a method of controlling a communication apparatus that comprises a security chip (TPM: Trusted Platform Module), comprising:

holding, in a private portion holder of the security chip, a private portion in a key predistribution system (KPS);

generating, in the security chip, a common key by the held private portion using a public portion in the key predistribution system transmitted from a communication partner; and generating, in the security chip, a ciphertext by encrypting a plaintext using the common key.

(Supplementary Note 11)

There is provided a program of controlling a communication apparatus that comprises a security chip (TPM: Trusted Platform Module), for causing a computer to execute a method, comprising:

holding, in a private portion holder of the security chip, a private portion in a key predistribution system (KPS);

generating, in the security chip, a common key by the held private portion using a public portion in the key predistribution system transmitted from a communication partner; and generating, in the security chip, a ciphertext by encrypting a plaintext using the common key.

(Supplementary Note 12)

There is provided a communication apparatus comprising a security chip (TPM: Trusted Platform Module), said security chip comprising:

a private portion holder that holds a private portion in a key predistribution system (KPS);

a common key generator that generates a common key by the held private portion using a public portion in the key predistribution system transmitted from a communication partner; and a decryptor that generates a plaintext by decrypting, using the common key, a ciphertext received from the communication partner.

(Supplementary Note 13)

There is provided the communication apparatus according to supplementary note 12, wherein said decryptor discards the common key after decryption using the common key.

(Supplementary Note 14)

There is provided a method of controlling a communication apparatus that comprises a security chip (TPM: Trusted Platform Module), comprising:

holding, in a private portion holder of the security chip, a private portion in a key predistribution system (KPS);

generating, in the security chip, a common key by the held private portion using a public portion in the key predistribution system transmitted from a communication partner; and generating a plaintext by decrypting, in the security chip a ciphertext received from the communication partner using the common key.

(Supplementary Note 15)

There is provided a program of controlling a communication apparatus that comprises a security chip (TPM: Trusted Platform Module), for causing a computer to execute a method, comprising:

holding, in a private portion holder of the security chip, a private portion in a key predistribution system (KPS);

generating, in the security chip, a common key by the held private portion using a public portion in the key predistribution system transmitted from a communication partner; and generating a plaintext by decrypting, in the security chip, a ciphertext received from the communication partner using the common key.

(Supplementary Note 16)

There is provided a security chip (TPM: Trusted Platform Module) of a communication apparatus, comprising:

a private portion holder that holds a private portion in a key predistribution system (KPS);

a common key generator that generates a common key in accordance with the key predistribution system based on the held private portion and a public portion in the key predistribution system transmitted from a communication partner, and a ciphertext generator that generates a ciphertext by receiving an encryption command attached with a plaintext and the public portion transmitted from the communication partner, causing said common key generator to generate the common key, and encrypting the plaintext using the common key.

(Supplementary Note 17)

There is provided the security chip according to supplementary note 16, wherein said ciphertext generator discards the common key after encryption using the common key.

(Supplementary Note 18)

There is provided the security chip according to supplementary note 16 or 17, further comprising a decryptor that generates a plaintext by receiving a decryption command attached with a ciphertext and the public portion transmitted from the communication partner, causing said common key generator to generate the common key, and decrypting the ciphertext using the common key.

(Supplementary Note 19)

There is provided the security chip according to supplementary note 18, wherein said decryptor discards the common key after decryption using the common key.

(Supplementary Note 20)

There is provided a security chip (TPM: Trusted Platform Module) of a communication apparatus, comprising:

a private portion holder that holds a private portion in a key predistribution system (KPS), a common key generator that generates a common key in accordance with the key predistribution system based on the held private portion and a public portion in the key predistribution system transmitted from a communication partner, and a decryptor that generates a plaintext by receiving a decryption command attached with a ciphertext and the public portion transmitted from the communication partner, causing said common key generator to generate the common key, and decrypting the ciphertext using the common key.

(Supplementary Note 21)

There is provided the security chip according to supplementary note 20, wherein said decryptor discards the common key after decryption using the common key.

The invention claimed is:

1. An encryption communication system that uses a pair of a first private portion and a first public portion and a pair of a second private portion and a second public portion in a key predistribution system (KPS), comprising:
 a ciphertext generator that generates a ciphertext by generating, in a first security chip (TPM: Trusted Platform Module) of a first communication apparatus, a first common key by the first private portion held in the first security chip using the second public portion transmitted from a second communication apparatus as a communication partner, and encrypting a plaintext using the first common key in the first security chip; and
 a decryptor that generates a plaintext by generating, in a second security chip of the second communication apparatus, a second common key by the second private portion held in the second security chip using the first public portion transmitted from the first communication apparatus as a communication partner, and decrypting the ciphertext received from the first communication apparatus using the second common key in the second security chip,
 wherein said ciphertext generator generates an initialization vector (IV) when performing encryption of block units, based on a part for the initialization vector held in the first private portion and a part for the initialization vector held in the second public portion, and use the generated initialization vector for the encryption, and
 said decryptor generates the initialization vector when performing decryption of block units, based on a part for the initialization vector held in the second private portion and a part for the initialization vector held in the first public portion, and use the generated initialization vector for the decryption, and
 further comprising:
 a first function provider that causes the first security chip to function as said ciphertext generator by making the first security chip store a program and data for providing functions of:
  a first private portion holder that receives and holds the first private portion;
  a first common key generator that generates the first common key in accordance with the key predistribution system based on the first private portion and the second public portion;
  a ciphertext generation controller that receives an encryption command attached with a plaintext and the second public portion, causes said first common key generator to generate the first common key, and encrypting the plaintext based on the first common key to generate a ciphertext; and
  a first initialization vector generator that generates the initialization vector based on the part for the initialization vector held in the first private portion and the part for the initialization vector held in the second public portion, and a second function provider that causes the second security chip to function as said decryptor by making the second security chip store a program and data for providing functions of:
  a second private portion holder that receives and holds the second private portion;
  a second common key generator that generates the second common key in accordance with the key predistribution system based on the second private portion and the first public portion;
  a decryption controller that receives a decryption command attached with a ciphertext and the first public portion, causes said second common key generator to generate the second common key, and decrypts the ciphertext based on the second common key to generate a plaintext; and
  a second initialization vector generator that generates the initialization vector based on the part for the initialization vector held in the second private portion and the part for the initialization vector held in the first public portion.

2. The encryption communication system according to claim 1, wherein said ciphertext generation controller discards the first common key after encryption using the first common key, and said decryption controller discards the second common key after decryption using the second common key.

3. The encryption communication system according to claim 1, further comprising:
 a first operation preparation unit that causes the first communication apparatus to hold, out of the pair of the first private portion and the first public portion in the key predistribution system, the first private portion in the first security chip of the first communication apparatus and transmit the first public portion to the second communication apparatus; and
 a second operation preparation unit that causes the second communication apparatus to hold, out of the pair of the second private portion and the second public portion in the key predistribution system, the second private portion in the second security chip of the second communication apparatus and transmit the second public portion to the first communication apparatus.

4. A communication apparatus comprising a security chip (TPM: Trusted Platform Module), that functions as the ciphertext generator in an encryption communication system according to claim 1,
 said security chip comprising:
  a private portion holder that holds a private portion in a key predistribution system (KPS);
  a common key generator that generates a common key by the held private portion using a public portion in the key predistribution system transmitted from a communication partner;
  a ciphertext generation controller that receives an encryption command attached with a plaintext and the public portion, causes said common key generator to generate the common key and generates a ciphertext by encrypting a plaintext using the common key; and
  an initialization vector (IV) generator that generates an initialization vector when performing encryption of block units, based on a part for the initialization vector held in the private portion and a part for the initialization vector held in the public portion, and
 said communication apparatus further comprising a function provider that makes the security chip store a program and data for providing functions of the private portion holder, the common key generator, the ciphertext generation controller and the initialization vector generator.

5. The communication apparatus according to claim 4, wherein said ciphertext generation controller discards the common key after encryption using the common key.

6. The communication apparatus according to claim 4, wherein said security chip further comprising a decryption controller that receives a decryption command attached with a ciphertext and the public portion from the communication partner, causes said common key generator to generate the common key and generates a plaintext by decrypting the ciphertext using the common key.

7. The communication apparatus according to claim 6, wherein said decryption controller discards the common key after decryption using the common key.

8. A security chip (TPM: Trusted Platform Module) of a communication apparatus according to claim 4, comprising:
a private portion holder that holds a private portion in a key predistribution system (KPS);
a common key generator that generates a common key in accordance with the key predistribution system based on the held private portion and a public portion in the key predistribution system transmitted from a communication partner;
a ciphertext generation controller that receives an encryption command attached with a plaintext and the public portion transmitted from the communication partner, causing said common key generator to generate the common key, and encrypting the plaintext using the common key to generate a ciphertext; and
an initialization vector (IV) generator that generates an initialization vector when performing encryption of block units, based on a part for the initialization vector held in the private portion and a part for the initialization vector held in the public portion,
wherein said security chip is provided with functions of the private portion holder, the common key generator, the ciphertext generation controller and the initialization vector generator by storing a program and data for providing the functions.

9. The security chip according to claim 8, wherein said ciphertext generation controller discards the common key after encryption using the common key.

10. The security chip according to claim 8, further comprising a decryption controller that receives a decryption command attached with a ciphertext and the public portion transmitted from the communication partner, causing said common key generator to generate the common key, and decrypting the ciphertext using the common key to generate a plaintext.

11. The security chip according to claim 10, wherein said decryption controller discards the common key after decryption using the common key.

12. The encryption communication system according to claim 2, further comprising an operation preparation unit that causes the first communication apparatus to hold, out of the pair of the first private portion and the first public portion in the key predistribution system, the first private portion in the first security chip of the first communication apparatus and transmit the first public portion to the communication partner of the first communication apparatus, and the second communication apparatus to hold, out of the pair of the second private portion and the second public portion in the key predistribution system, the second private portion in the second security chip of the second communication apparatus and transmit the second public portion to the communication partner of the second communication apparatus.

13. The communication apparatus according to claim 5, further comprising an operation preparation unit that causes the communication apparatus to hold, out of the pair of the private portion and the public portion in the key predistribution system, the private portion in the security chip of the communication apparatus and transmit the public portion to the communication partner of the communication apparatus.

* * * * *